United States Patent
Suzuki et al.

(10) Patent No.: US 10,386,580 B2
(45) Date of Patent: Aug. 20, 2019

(54) OPTICAL SIGNAL TRANSMISSION SYSTEM AND OPTICAL RECEPTACLE

(71) Applicant: OLYMPUS CORPORATION, Hachioji-shi, Tokyo (JP)

(72) Inventors: Toshiaki Suzuki, Tokyo (JP); Yasuhiro Miyazaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/840,564

(22) Filed: Dec. 13, 2017

(65) Prior Publication Data

US 2018/0100971 A1    Apr. 12, 2018

Related U.S. Application Data

(63) Continuation of application No. PCT/JP2015/003345, filed on Jul. 2, 2015.

(51) Int. Cl.
  *G02B 6/32* (2006.01)
  *G02B 6/42* (2006.01)
  *G02B 23/26* (2006.01)

(52) U.S. Cl.
  CPC ............ *G02B 6/32* (2013.01); *G02B 6/4206* (2013.01); *G02B 6/4207* (2013.01);
  (Continued)

(58) Field of Classification Search
  None
  See application file for complete search history.

(56) References Cited

U.S. PATENT DOCUMENTS 2,964,636 A * 12/1960 Cary .................. G01J 1/04
                                                   136/259
4,636,631 A *  1/1987 Carpentier ...... H01L 31/02327
                                                   250/216
(Continued)

FOREIGN PATENT DOCUMENTS

CN    103582837 A     2/2014
CN    104166188 A    11/2014
(Continued)

OTHER PUBLICATIONS

International Search Report (ISR) and Written Opinion dated Aug. 4, 2015 issued in International Application No. PCT/JP2015/003345.

(Continued)

*Primary Examiner* — Michael Stahl
(74) *Attorney, Agent, or Firm* — Holtz, Holtz & Volek PC

(57) ABSTRACT

In an optical signal transmission system for transmitting signal light through a transmitting fiber, an optical connector, and a receiving fiber to an optical receptacle, the relationships $\phi 1ex < \phi 2en$ and $\phi pd < \phi 2en$ are satisfied, where $\phi 1ex$ is the core diameter of the transmitting fiber at the exit face of the transmitting fiber, $\phi 2en$ is the core diameter of the receiving fiber at the entrance face of the receiving fiber, and $\phi pd$ is the diameter of a receiving surface of a light receiving element in the optical receptacle, and the relationship $NA1ex > Na2en$ is satisfied, where, in the optical connector, $NA1ex$ is the numerical aperture (NA) of the signal light emitted from the transmitting fiber, and $NA2en$ is the NA of the signal light incident on the receiving fiber.

16 Claims, 23 Drawing Sheets

(52) U.S. Cl.
CPC ......... *G02B 6/4212* (2013.01); *G02B 6/4292* (2013.01); *G02B 23/26* (2013.01)

(56) References Cited

U.S. PATENT DOCUMENTS

| | | | | |
|---|---|---|---|---|
| 5,545,896 | A * | 8/1996 | Bratt | G01J 5/02 250/338.1 |
| 5,939,709 | A * | 8/1999 | Ghislain | B82Y 20/00 250/216 |
| 6,114,689 | A * | 9/2000 | Cho | G02B 3/08 250/216 |
| 6,532,244 | B1 * | 3/2003 | Dewey | G02B 6/2808 372/108 |
| 9,291,783 | B2 | 3/2016 | Shibuya | |
| 2005/0190436 | A1 | 9/2005 | Terada et al. | |
| 2012/0177327 | A1 | 7/2012 | Demeritt et al. | |
| 2012/0241891 | A1 * | 9/2012 | Maryfield | G02B 23/12 257/432 |
| 2014/0086536 | A1 | 3/2014 | Shibuya | |
| 2014/0355939 | A1 | 12/2014 | Shibuya | |

FOREIGN PATENT DOCUMENTS

| | | |
|---|---|---|
| JP | 07181339 A | 7/1995 |
| JP | 2005032909 A | 2/2005 |
| JP | 2005318532 A | 11/2005 |
| JP | 2009003007 A | 1/2009 |
| JP | 2014232261 A | 12/2014 |
| WO | 2005083490 A1 | 9/2005 |

OTHER PUBLICATIONS

Kenichi Nishimura, et al, "Yasashii Hikari Fiber Tsushin," Revised Second Edition, 8th Print, Ohmsha, Ltd., Jun. 20, 1998, pp. 111 and 112.

Chinese Office Action (and English language translation thereof) dated Dec. 3, 2018 issued in counterpart Chinese Application No. 201580080895.7.

Japanese Office Action (and English language translation thereof) dated Nov. 27, 2018 issued in counterpart Japanese Application No. 2017-525688.

Chinese Office Action dated May 8, 2019 (and English translation thereof) issued in counterpart Chinese Application No. 201580080895.7.

* cited by examiner

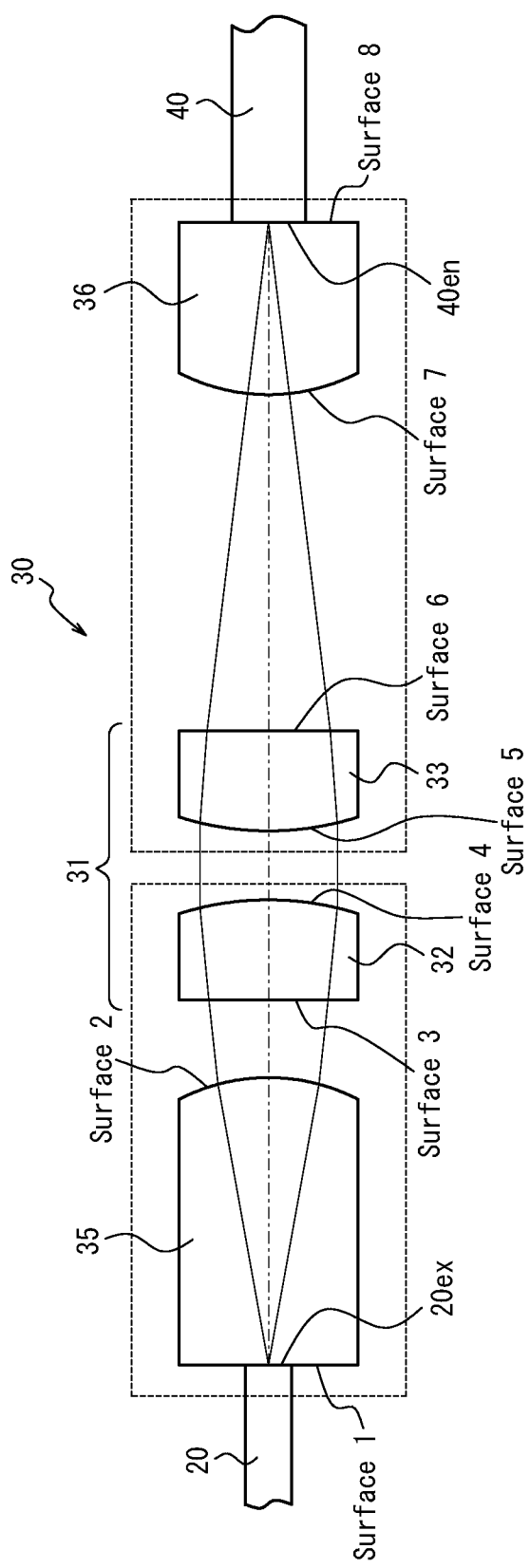

OPTICAL SIGNAL TRANSMISSION SYSTEM AND OPTICAL RECEPTACLE

CROSS-REFERENCE TO RELATED APPLICATION

The present application is a Continuing Application based on International Application PCT/JP2015/003345 filed on Jul. 2, 2015, the entire disclosure of which is incorporated herein by reference.

TECHNICAL FIELD

The disclosure relates to an optical signal transmission system and to an optical receptacle that can be used in this system.

BACKGROUND

Patent literature (PTL) 1, for example, discloses an optical signal transmission system. The optical signal transmission system disclosed in PTL 1 transmits signal light emitted from a laser diode to an optical receptacle through a transmitting fiber, an optical connector, and a receiving fiber. PTL 2, for example, discloses an optical connector used in such an optical signal transmission system. PTL 3, for example, discloses an optical receptacle.

The optical connector disclosed in PTL 2 is a spatial coupling type of connector that couples the transmitting fiber and the receiving fiber via a lens. The lens is configured to form an image by reducing the exit face of the transmitting fiber in size to the entrance face of the receiving fiber. As a result, this configuration maintains an optical line even if the spot position of the signal light incident on the receiving fiber deviates slightly from the core center of the receiving fiber. Therefore, the numerical aperture (NA) of the receiving fiber needs to be larger than the NA of the transmitting optical fiber.

The optical receptacle disclosed in PTL 3 includes a lens and a light receiving element, focuses signal light, which is diffusely emitted from the exit face of the receiving fiber into space, onto the light receiving element with the lens, and subjects the signal light to photoelectric conversion. Here, a light receiving element with a small-diameter receiving surface is used. In particular, optical signal transmission systems have been expected in recent years to support transmission of high-definition video signals, for example, and are thus required to achieve high-speed communication at 10 Gbps to 40 Gbps. Therefore, the diameter of the receiving surface (receiving diameter) has tended to reduce in size, since a smaller size achieves a good frequency response speed, with a receiving diameter of approximately 50 μm being frequently used. Accordingly, the lens is configured to form an image by reducing the exit face of the transmitting fiber in size on the light receiving element. As a result, the NA of the light beam incident on the light receiving element is greater than the NA of the receiving fiber.

CITATION LIST

Patent Literature

PTL 1: JP 2005-318532 A
PTL 2: JP 1107-181339 A
PTL 3: JP 2014-232261 A

SUMMARY

An optical signal transmission system according to the disclosure comprises:

a transmitting fiber configured to transmit signal light and comprising an exit face from which the signal light is emitted;

a receiving fiber configured to transmit the signal light and comprising an entrance face on which the signal light emitted from the exit face of the transmitting fiber is incident and an exit face from which the signal light is emitted;

an optical connector disposed between the transmitting fiber and the receiving fiber and comprising a lens configured to guide the signal light emitted from the exit face of the transmitting fiber to the entrance face of the receiving fiber; and an optical receptacle comprising a light receiving element and a lens, the light receiving element comprising a receiving surface on which the signal light transmitted through the receiving fiber is incident and being configured to subject the incident signal light to photoelectric conversion, and the lens of the optical receptacle being configured to guide the signal light transmitted through the receiving fiber to the receiving surface, wherein $\phi 1ex < \phi 2en$, and $\phi pd < \phi 2en$, where $\phi 1ex$ is a core diameter of the transmitting fiber at the exit face of the transmitting fiber, where $\phi 2en$ is a core diameter of the receiving fiber at the entrance face of the receiving fiber, and where $\phi pd$ is a diameter of the receiving surface of the light receiving element, $NA1ex > NA2en$, and $\phi 1ex \times NA1ex < \phi 2en \times NA2en$, where, in the optical connector, $NA1ex$ is a numerical aperture (NA) of the signal light emitted from the transmitting fiber and $NA2en$ is an NA of the signal light incident on the receiving fiber, the optical receptacle is configured so that $NA2ex < NApd$ at the lens within the optical receptacle, where $NA2ex$ is an NA at the receiving fiber side, and where $NApd$ is an NA of the signal light incident on the light receiving element, and the receiving fiber and the light receiving element are configured to satisfy $\phi 2ex \times NA2ex < \phi pd \times NApd$, where $\phi 2ex$ is a core diameter of the exit face of the receiving fiber.

Furthermore, an optical signal transmission system according to the disclosure comprises:

a transmitting fiber configured to transmit signal light and comprising an exit face from which the signal light is emitted;

a receiving fiber configured to transmit the signal light and comprising an entrance face on which the signal light emitted from the exit face of the transmitting fiber is incident and an exit face from which the signal light is emitted;

an optical connector disposed between the transmitting fiber and the receiving fiber and comprising a lens configured to guide the signal light emitted from the exit face of the transmitting fiber to the entrance face of the receiving fiber; and an optical receptacle comprising a light receiving element and a lens, the light receiving element comprising a receiving surface on which the signal light transmitted through the receiving fiber is incident and being configured to subject the incident signal light to photoelectric conversion, and the lens of the optical receptacle being configured to guide the signal light transmitted through the receiving fiber to the receiving surface, wherein $$\phi 1ex<\phi 2en, \text{ and}$$

$$\phi pd<\phi 2en,$$

where $\phi 1ex$ is a core diameter of the transmitting fiber at the exit face of the transmitting fiber, where $\phi 2en$ is a core diameter of the receiving fiber at the entrance face of the receiving fiber, and where $\phi pd$ is a diameter of the receiving surface of the light receiving Ion element, $$NA1ex>NA2en, \text{ and}$$

$$\phi 1ex \times NA1ex<\phi 2en \times NA2en,$$

where, in the optical connector, NA1ex is a numerical aperture (NA) of the signal light emitted from the transmitting fiber and NA2en is an NA of the signal light incident on the receiving fiber, the optical receptacle is configured so that $$NA2ex<NApd$$

at the lens within the optical receptacle, where NA2ex is an NA at the receiving fiber side, and where NApd is an NA of the signal light incident on the light receiving element, and the receiving fiber and the light receiving element are configured to satisfy $$\phi 2ex \times NA2ex<\phi pd \times NApd,$$

where $\phi 2ex$ is a core diameter of the exit face of the receiving fiber, and the optical receptacle further comprises a solid immersion lens joined to the light receiving element.

Furthermore, an optical receptacle according to the disclosure comprises:

a lens configured to focus light emitted from an optical fiber;

a light receiving element configured to receive the light focused by the lens; and a solid immersion lens coupled to a receiving surface of the light receiving element.

BRIEF DESCRIPTION OF THE DRAWINGS

In the accompanying drawings:

FIG. 14 illustrates the surface numbers in lens data for the optical connector in FIG. 12;

DETAILED DESCRIPTION

Figure 28:
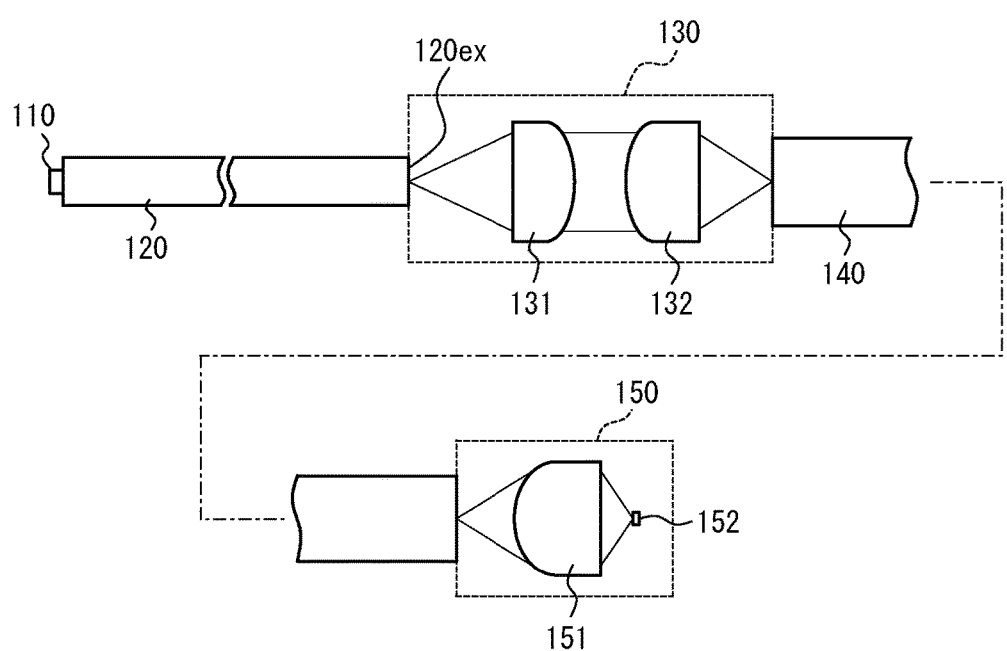
FIG. 28 illustrates a conventional optical signal transmission system.

Upon configuring an optical signal transmission system using the above-described optical connector and optical receptacle, reduction and imaging of the signal light is repeated in the optical connector and the optical receptacle, causing the NA of the light beam ultimately incident on the light receiving element to become excessively large. FIG. 28 illustrates a configuration example of an optical signal transmission system in this case. Signal light diffusely emitted from a laser diode 110 is transmitted to an optical receptacle 150 through a transmitting fiber 120, an optical connector 130, and a receiving fiber 140.

The optical connector 130 includes lenses 131 and 132. Signal light emitted from an exit face 120ex of the transmitting fiber 120 is formed as parallel light by the lens 131 and is focused and caused to be incident on the entrance face of the receiving fiber 140 by the lens 132. The optical connector 130 is configured to be detachable between the lens 131 and the lens 132. The optical receptacle 150 includes a lens 151 and a light receiving element 152. Signal light emitted from the exit face of the receiving fiber 140 is focused on the light receiving element 152 by the lens 151.

As illustrated in FIG. 28, when signal light that is diffusely emitted from the laser diode 110 is incident directly on the transmitting fiber 120, the core diameter and NA of the transmitting fiber 120 need to be a certain size, such as a core diameter of 50 µm and an NA of 0.27, for more light to be incident on the transmitting fiber 120. If the receiving fiber 140 has the same core diameter as the transmitting fiber 120 in this case, then the lenses 131 and 132 in the optical connector 130 need to cause the signal light emitted from the transmitting fiber 120 to be incident on the receiving fiber 140 with a light spot smaller than the core diameter. Therefore, the tolerance for alignment error in this case is a small value of approximately 20 µm to 30 µm at most.

It is thus envisioned that the receiving fiber 140 will be thicker than the transmitting fiber 120 and will, for example, have a core diameter of 150 µm and an NA of 0.3. In this case, upon setting the receiving diameter of the light receiving element 152 to 50 µm in the optical receptacle 150, the reduction ratio of the lens 151 becomes ⅓ so as to focus the signal light emitted from the receiving fiber 140 on the light receiving element 152 with the lens 151. Accordingly, the NA of the light beam focused on the light receiving element 152 in this case becomes three times the NA of the receiving fiber 140, i.e. 0.9.

If, however, the NA of the light beam incident on the light receiving element 152 thus increases, the aberration of the lens 151 also increases, reducing the light focusing properties and making it difficult to reduce the diameter of the receiving surface of the light receiving element 152. As a result, an improvement in the frequency response speed can no longer be expected. Furthermore, since the light receiving element 152 is configured by material with a high refractive index, such as silicon, and has surface reflectance of 30% or greater, the return light when the signal light is reflected by the light receiving element 152 may adversely affect the signal light emitted from the laser diode 110. Therefore, while an anti-reflective coating is often applied to the receiving surface of the light receiving element 152, the anti-reflective coating exhibits dependence on the angle of incidence and cannot be expected to yield a sufficient effect for incident light over a wide angle.

For these reasons, it is difficult to maintain a stable optical line in a conventional optical signal transmission system, and a reduction in reliability of the system is feared.

In light of these considerations, it would be helpful to provide an optical signal transmission system that can maintain a stable optical line while maintaining the frequency response speed of the light receiving element and that can improve reliability of the system. It would also be helpful to provide an optical receptacle that can be used in this system.

First, before describing embodiments of the disclosure, the principal configuration and effects of an optical signal transmission system according to the disclosure are described.

(Principal Configuration)

The first principal configuration of an optical signal transmission system according to the disclosure makes $\phi 2en$ greater than $\phi 1ex$ and $\phi pd$, where $\phi 2en$ is the core diameter at the entrance face of the receiving fiber, $\phi 1ex$ is the core diameter at the exit face of the transmitting fiber, and $\phi pd$ is the diameter of the receiving surface of the light receiving element. The optical connector is also configured to make $NA1ex$ greater than $NA2en$, where $NA1ex$ is the NA of the signal light emitted from the transmitting fiber, and $NA2en$ is the NA of the signal light incident on the receiving fiber. In other words, a fiber with a larger core diameter than that of the transmitting fiber and larger than the receiving surface of the light receiving element is used as the receiving fiber, and a lens disposed in the optical connector makes the $NA2en$ of the signal light incident on the receiving fiber smaller than the $NA1ex$ of the signal light emitted from the transmitting fiber.

The second principal configuration of an optical signal transmission system according to the disclosure makes $\phi 2en$, the core diameter at the entrance face of the receiving fiber, greater than $\phi 1ex$, the core diameter at the exit face of the transmitting fiber, and greater than $\phi pd$, the diameter of the receiving surface of the light receiving element. A solid immersion lens (SIL) is coupled to the light receiving element of the optical receptacle. In other words, a fiber with a larger core diameter than that of the transmitting fiber and the receiving surface of the light receiving element is used as the receiving fiber, and a solid immersion lens is joined to the light receiving element in the optical receptacle.

(Effects)

First, the effects of the first principal configuration are explained.

When a small area, such as the receiving fiber in the optical connector or the light receiving element in the optical receptacle, is illuminated through a lens, a trade-off exists in that the NA increases upon narrowing the light spot of the illumination light, whereas the light spot increases upon reducing the NA of the illumination light. To account for this trade-off, the concept of "etendue" is introduced in the disclosure.

Figure 1:
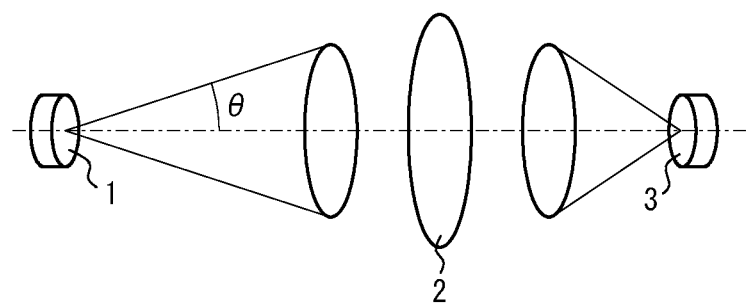
FIG. 1 illustrates etendue.

Etendue is a physical quantity yielded by multiplying a solid angle by an area. As illustrated in FIG. 1, when illumination light emitted from an emission surface 1 is focused by a lens 2 and caused to be incident on a receiving surface 3, and the shape of the emission surface 1 or the receiving surface 3 is a circle of diameter D, then the etendue E can be approximated as indicated in Expression (1) below, using the NA of the emitted or incident illumination light. FIG. 1 illustrates an example of when illumination light is emitted from a circular emission surface 1 of diameter D at numerical aperture NA, is focused by the lens 2, and is incident on the receiving surface 3.

$$E \equiv \text{solid angle of light beam} \times \text{area} \qquad (1)$$
$$= 2\pi S(1 - \cos\theta) \approx \frac{\pi}{4}(D \cdot NA)^2$$

Using etendue, the condition for illuminating light efficiently without loss can be expressed as follows.

etendue of emission surface 1 ≤ etendue of receiving surface 3

Applying this to an optical signal transmission system yields the following condition for transmitting signal light without loss.

(etendue of transmitting fiber)≤(etendue of receiving fiber)≤(etendue of light receiving element)  (5)

Figure 2:
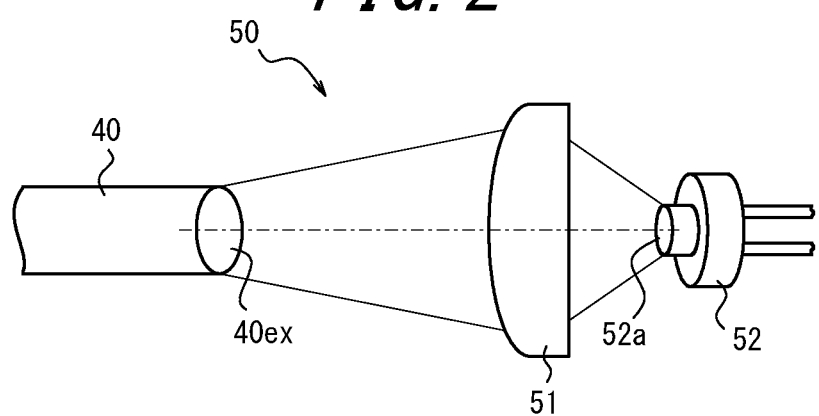
FIG. 2 illustrates an optical receptacle in a first principal configuration of the disclosure.

From these considerations, the condition for reducing NApd can be derived, where NApd is the NA of the signal light incident on the light receiving element in the optical receptacle. Specifically, when the signal light emitted from an exit face 40ex of a receiving fiber 40 in an optical receptacle 50 is focused by a lens 51 and caused to be incident on a receiving surface 52a of a light receiving element 52 as illustrated in FIG. 2, then Expression (2) below holds from the imaging relationship of the lens, where ϕ2ex is the core diameter at the exit face 40ex of the receiving fiber 40, and NA2ex is the NA of the signal light emitted from the receiving fiber 40.

$$NApd = \frac{\Phi 2ex}{\Phi pd} NA2ex \qquad (2)$$

The NApd of the signal light incident on the receiving surface 52a is represented by Expression (3) below from the approximation formula for etendue in Expression (1) above.

$$NApd \approx \frac{2}{\Phi pd} \sqrt{E/\pi} \qquad (3)$$

From Expression (3), the NApd of signal light incident on the receiving surface 52a can be reduced by reducing the etendue E of the receiving fiber 40.

Here, the etendue of the receiving fiber 40 needs to be determined taking into consideration not only the optical receptacle 50, but also the optical connector that relays the signal light from the transmitting fiber to the receiving fiber 40. To transmit signal light without loss in the optical connector, the etendue of the receiving fiber 40 needs to be increased above the etendue of the transmitting fiber. If the etendue of the receiving fiber 40 is too large, however, the NApd of the signal light incident on the receiving surface 52a increases as described above. Hence, the etendue of the receiving fiber 40 needs to be set appropriately.

Figure 3:
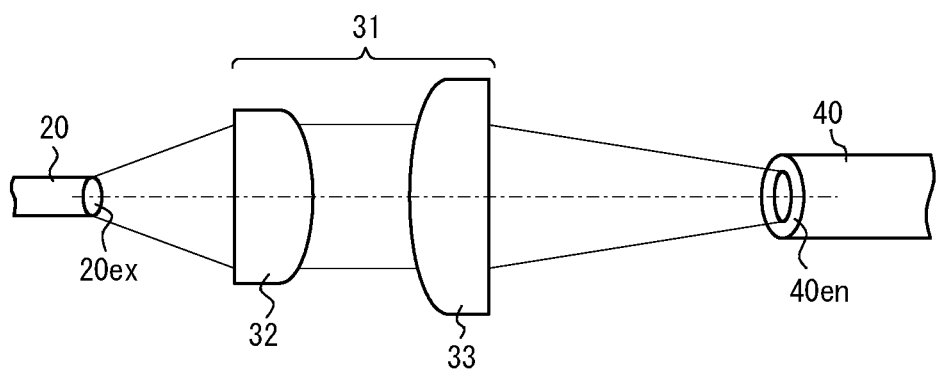
FIG. 3 illustrates an optical connector in the first principal configuration of the disclosure.

FIG. 3 illustrates the schematic configuration of the optical connector. An optical connector 30 includes a lens 31 that guides signal light emitted from an exit face 20ex of a transmitting fiber 20 to an entrance face 40en of the receiving fiber 40. In FIG. 3, the lens 31 includes two plano-convex lenses 32 and 33 disposed so that the convex surfaces face each other. The optical connector 30 is, for example, detachably coupled between the plano-convex lenses 32 and 33. The optical connector 30 converts the signal light emitted from the exit face 20ex of the transmitting fiber 20 into parallel light with the plano-convex lens 32 and focuses the parallel signal light with the plano-convex lens 33, causing the focused light to be incident on the entrance face 40en of the receiving fiber 40.

In the first principal configuration, the etendue E of the signal light incident on the receiving fiber 40 is represented by Expression (4) below, where in FIG. 3, $E_0$ is the etendue of the signal light emitted from the transmitting fiber 20, and δ is the clearance of the light spot of signal light incident on the entrance face 40en of the receiving fiber 40.

$$E \approx E_0 + \frac{\pi}{4}(\delta \cdot NA2en)^2 \qquad (4)$$

In Expression (4) above, the etendue $E_0$ is represented by Expression (5) below from Expression (1) above, using the core diameter ϕ1ex at the exit face 20ex of the transmitting fiber 20 and the NA1ex of the signal light emitted from the transmitting fiber 20.

$$E_0 \approx \frac{\pi}{4}(\Phi 1ex \cdot NA1ex)^2 \qquad (5)$$

In Expression (4) above, the NA2en of the signal light incident on the entrance face 40en of the receiving fiber 40 is represented by Expression (6) below, where βcon is the imaging magnification of the optical connector 30.

$$NA2en = \frac{NA1ex}{\beta con} \qquad (6)$$

In the first principal configuration of the optical signal transmission system according to the disclosure, the NA2en of the incident light beam of signal light on the receiving fiber is reduced as a trade-off for making the core diameter of the receiving fiber greater than the core diameter of the transmitting fiber, thereby preventing the etendue of the receiving fiber from increasing excessively. In other words, whereas the imaging relationship for the lens of the transmitting fiber and the receiving fiber in a conventional optical connector constitutes a reduction ratio, the first principal configuration has a lens arrangement with a magnifying ratio. As a result, a fiber with a small NA can be used as the receiving fiber, allowing the NApd of the light beam incident on the light receiving element in the optical receptacle to be reduced.

Next, the effects of the above-described second principal configuration are explained.

In the optical signal transmission system illustrated in FIG. 28, the etendue gradually expands sequentially as the signal light from the transmitting fiber 120 passes through the receiving fiber 140 and reaches the light receiving element 152. Hence, the maximum angle of incidence of a light ray ultimately incident on the light receiving element 152 from the lens 151 of the optical receptacle 150 becomes excessively large. The reason is that demanding that the light receiving element 152 be provided with a large etendue necessarily increases the NA as a tradeoff for reducing the diameter of the light receiving element 152.

Therefore, in the second principal configuration of the optical signal transmission system according to the disclosure, for example the receiving surface is embedded in the medium of a solid immersion lens by joining a solid immersion lens to the receiving surface. As a result, the NA of the light receiving element is increased without increasing the maximum angle of incidence of the incident signal light. In other words, the solid immersion lens acts to expand the etendue of the light receiving element.

Figure 4A:
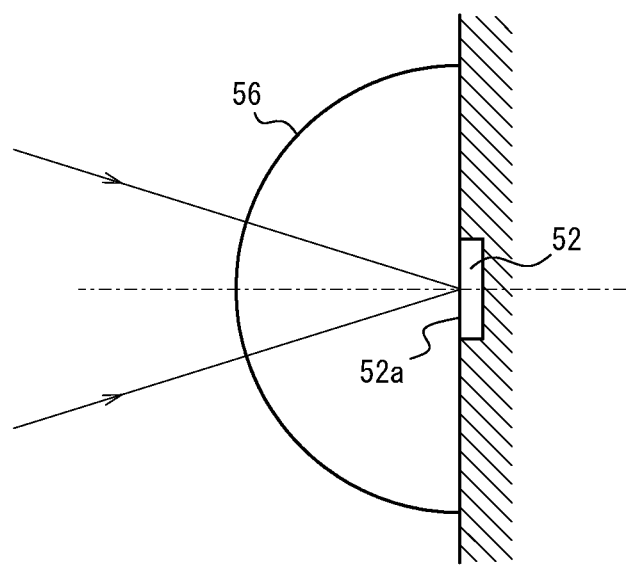
FIG. 4A illustrates a hemispherical lens in a second principal configuration of the disclosure.
Figure 4B:
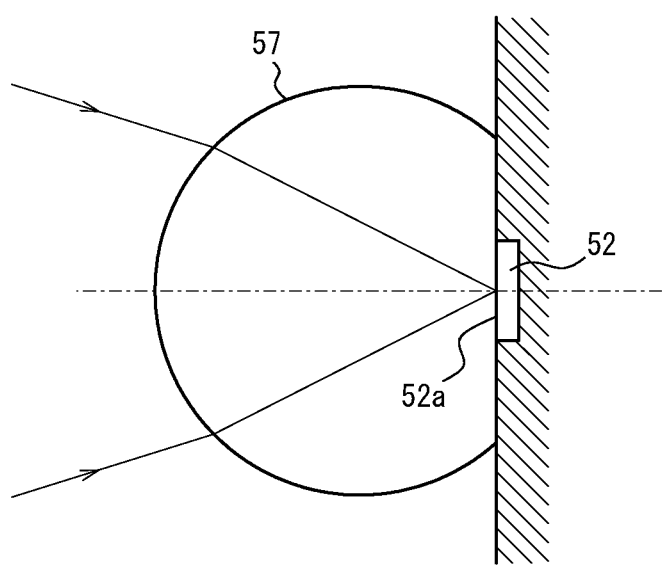
FIG. 4B illustrates a super-hemispherical ns in the second principal configuration of the disclosure.

As the solid immersion lens, for example the hemispherical lens 56 illustrated in FIG. 4A or the super-hemispherical lens 57 illustrated in FIG. 4B may be used. In FIG. 4A, the hemispherical lens 56 focuses the incident light from the spherical surface on the spherical center. Accordingly, the light receiving element 52 is joined to the flat surface of the hemispherical lens 56 with adhesive or the like so that the receiving surface 52a is positioned at the spherical center of the hemispherical lens 56. In FIG. 4B, the super-hemispherical lens 57 is configured so that the incident points of the light beam on the spherical surface and the focal point are in a positional relationship satisfying an aplanatic condition (a condition such that spherical aberration and comatic aberration do not occur), and the focal point is formed on the flat surface. Accordingly, the light receiving element 52 is joined to the flat surface of the super-hemispherical lens 57 with adhesive or the like so that the receiving surface 52a is positioned at the focal point of the super-hemispherical lens 57.

In the case of the hemispherical lens 56 illustrated in FIG. 4A, the light ray heading towards the spherical center of the hemispherical lens 56 is focused in the medium of the hemispherical lens 56 without being refracted at the spherical surface of the hemispherical lens 56. Accordingly, the NApd of the signal light incident on the light receiving element 52 is a multiple of the refractive index of the medium of the hemispherical lens 56 with respect to air. In the case of the super-hemispherical lens 57 illustrated in FIG. 4B, the signal light is refracted at the spherical surface of the super-hemispherical lens 57, is focused at a numerical aperture that is a multiple of the refractive index of the medium of the super-hemispherical lens 57, and is further focused within the medium of the super-hemispherical lens 57. Accordingly, the NApd of the signal light incident on the light receiving element 52 is the square of the refractive index of the medium of the super-hemispherical lens 57 with respect to air.

In the second principal configuration of the optical signal transmission system according to the disclosure, focusing light in the medium of the solid immersion lens thus increases the NApd as compared to when focusing light on the light receiving element 52 directly in air. Hence, the maximum angle of incidence of the light ray incident on the light receiving element can be reduced to obtain a desired etendue. As a result, a receiving fiber with a large core diameter can be used.

Embodiments of the disclosure are described below.

Embodiment 1

Figure 5:
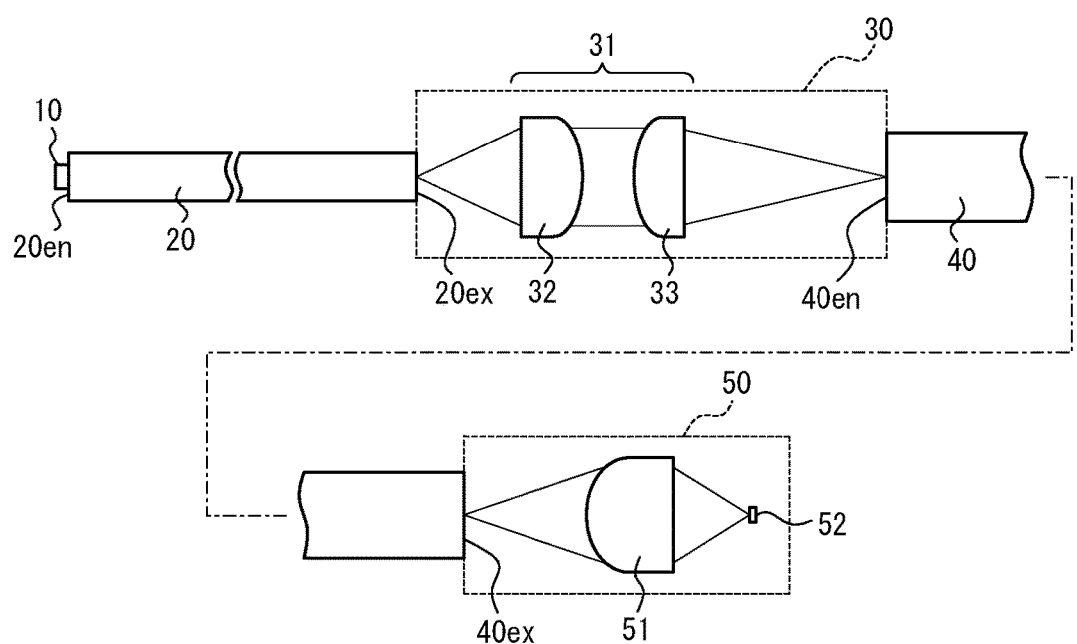
FIG. 5 is a principal configurational diagram of an optical signal transmission system according to Embodiment 1.

FIG. 5 illustrates the principal configuration of the optical signal transmission system according to Embodiment 1. The optical signal transmission system illustrated in FIG. 5 transmits signal light diffusely emitted from a laser diode 10 to the optical receptacle 50 through the transmitting fiber 20, the optical connector 30, and the receiving fiber 40.

The laser diode 10 is coupled to an entrance face 20en of the transmitting fiber 20 and causes signal light to be directly incident on the transmitting fiber 20. The transmitting fiber 20 transmits the signal light incident on the entrance face 20en and emits the signal light from the exit face 20ex to the optical connector 30.

As explained with reference to FIG. 3, the optical connector 30 includes plano-convex lenses 32 and 33, disposed so that the convex surfaces face each other, as a lens 31 that guides signal light emitted from the exit face 20ex of the transmitting fiber 20 to the entrance face 40en of the receiving fiber 40. The plano-convex lens 32 converts the signal light emitted from the exit face 20ex of the transmitting fiber 20 into parallel light and causes the parallel signal light to be incident on the plano-convex lens 33. The plano-convex lens 33 focuses the parallel signal light from the plano-convex lens 32 and causes the signal light to be incident on the entrance face 40en of the receiving fiber 40. The optical connector 30 is configured to be detachable between the plano-convex lens 32 and the plano-convex lens 33.

The receiving fiber 40 transmits the signal light incident on the entrance face 40en and emits the signal light from the exit face 40ex to the optical receptacle 50. The optical receptacle 50 includes the lens 51 and the light receiving element 52, focuses the signal light emitted from the exit face 40ex of the receiving fiber 40 with the lens 51, and causes the signal light to be incident on the light receiving element 52.

In the present embodiment, $\phi 1$ and NA1 need to have a certain magnitude so that signal light emitted diffusely from the laser diode 10 is incident directly on the transmitting fiber 20, where $\phi 1$ is the core diameter and NA1 is the NA of the transmitting fiber 20. Therefore, the transmitting fiber 20 is configured by a multi-mode fiber that, for example, has a core diameter $\phi 1$ of 50 μm and an NA1 of 0.27. The transmitting fiber 20 has a core diameter $\phi 1$ such that the core diameter $\phi 1$en at the entrance face 20en is equivalent to the core diameter $\phi 1$ex at the exit face 20ex.

in the optical connector 30, the receiving fiber 40 is configured to satisfy the relationship (etendue of transmitting fiber 20) ≤(etendue of receiving fiber 40). Therefore, the receiving fiber 40 is configured to satisfy the relationship 50 μm×0.27≤$\phi 2$×NA2 as condition 1, where $\phi 2$ is the core diameter, and NA2 is the NA. The receiving fiber 40 has a core diameter $\phi 2$ such that the core diameter $\phi 2$en at the entrance face 40en is equivalent to the core diameter $\phi 2$ex at the exit face 40ex.

On the other hand, the light receiving element 52 is configured so that the aperture (receiving diameter) at the receiving surface 52a is a small value of, for example, 50 μm so that the optical receptacle 50 can support high-speed communication at 10 Gbps to 40 Gbps. The NApd of the signal light incident on the light receiving element 52 is set to 0.65, for example, taking the NA of the lens 51, for example, as a reasonable upper limit for the optical design. Therefore, as condition 2, the optical receptacle 50 is configured to satisfy the relationship $\phi 2$×NA2≤50 μm×0.65 from (etendue of receiving fiber 40)≤(etendue of light receiving element 52).

The optical connector 30 is configured so that the NA2 en of signal light focused on the receiving fiber 40 is smaller than the NA1ex of the signal light emitted from the transmitting fiber 20. Accordingly, the receiving fiber 40 is configured to satisfy NA2<0.27 as condition 3.

Figure 6:
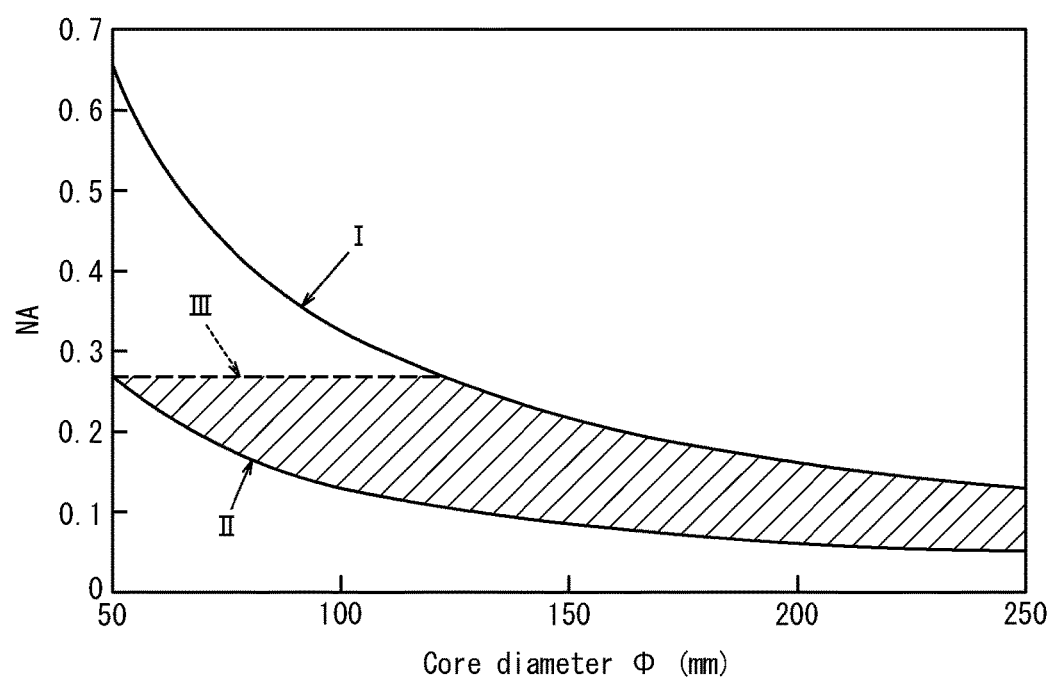
FIG. 6 illustrates a receiving fiber that can be used in FIG. 5.

FIG. 6 illustrates a receiving fiber 40 that can be used in the present embodiment. in FIG. 6, the vertical axis represents NA, and the horizontal axis represents the core diameter $\phi$. The curve I represents the upper limit of the NA2 of the receiving fiber 40 as determined by the etendue of the optical receptacle 50. The curve II represents the lower limit of the NA2 of the receiving fiber 40 as determined by the etendue of the optical connector 30. The dashed line III represents the NA1 of the transmitting fiber 20 (0.27).

In the present embodiment, the hatched area in FIG. 6 is the usable area that satisfies the above conditions 1 to 3 as the receiving fiber 40. It is clear from FIG. 6 that when the receiving fiber 40 is configured to have a large core diameter $\phi 2$, the NA2 inversely needs to be small. In the present embodiment, the receiving fiber 40 is configured by a multi-mode fiber that, tier example, has a core diameter $\phi 2$ of 150 μm and an NA2 of 0.2.

Multi-mode fibers come in a graded index type, which has a distribution such that the refractive index of the core decreases from the center outward, and a step index type, in which the refractive index of the core is homogenous. A graded index type fiber is considered to have better signal quality because no transmission delay occurs between the light passing through the core center and the light passing through the periphery. Since the NA gradually decreases from the center of the core to the outside, however, using such a fiber at the receiving side of the optical connector causes incident light to leak even when no alignment error is present, leading to a greater optical loss than with a step index type. For short distance communication such as indoor wiring, the step index type fiber with low optical loss is preferable, since the time delay of the optical signal causes nearly no problem.

Next, the lens configuration of the optical connector 30 is described.

Figure 7:
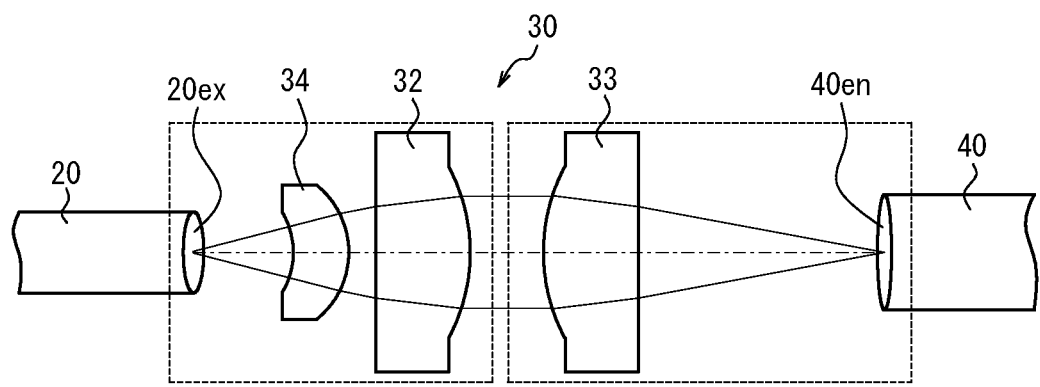
FIG. 7 is a schematic configuration diagram of the optical connector in FIG. 5.

FIG. 7 is a schematic configuration diagram of the optical connector 30. As described above, the optical connector 30 includes the plano-convex lenses 32 and 33 and is configured so that the transmitting end is detachable from the receiving end at the parallel light section between the plano-convex lens 32 and the plano-convex lens 33. In this case, if dirt such as dust adheres to the convex surface of the plano-convex lenses 32 and 33 at the detachable portion where the light is parallel, then the signal light is blocked, and the optical line cannot be maintained. Hence, the light beam diameter of the parallel light needs to be sufficiently larger than the size of presumed dust. Specifically, a light beam diameter of approximately 1 mm to 3 mm is appropriate. In the present embodiment, the light beam diameter is, for example, 3 mm.

In this case, the plano-convex lens 32 on the transmitting fiber 20 side has a focal length of 5.5 mm, which follows from the optical beam diameter being 1.5 mm and the NA1 of the transmitting fiber 20 being 0.27.

The plano-convex lens 33 on the receiving fiber 40 side would have a focal length of 7.5 mm, which follows from the optical beam diameter being 1.5 mm and the NA2 of the receiving fiber 40 being 0.2. The focal length of the plano-convex lens 33 in the present embodiment, however, is slightly greater. In this manner, by slightly increasing the focal length of the plano-convex lens 33, the NA2en of the light beam focused on the receiving fiber 40 becomes slightly smaller than the NA2 of the receiving fiber 40. Hence, leakage of incident light on the receiving fiber 40 due to the optical axis inclination error when coupling the optical connector 30 can be reduced. In the present embodiment, the focal length of the plano-convex lens 33 is therefore increased slightly from 7.5 mm to 8.0 mm.

As a result, the optical connector 30 forms an image of the exit face (core face) 20ex of the transmitting fiber 20 on the entrance face (core face) 40en of the receiving fiber 40 at an imaging magnification βcon of 1.45. Accordingly, the signal light can be caused to be incident on the receiving fiber 40 at a sufficiently small light spot diameter of 72 μm (which equals the core diameter φ1 (50 μm) of the transmitting fiber 20×the imaging magnification βcon (1.45)) relative to the core diameter of the receiving fiber 40 of 150 μm.

The plano-convex lenses 32 and 33 may be configured as spherical lenses, but in the present embodiment, the plano-convex lenses 32 and 33 are configured as aspherical lenses. In this case, the plano-convex lens 32 on the transmitting fiber 20 side can be the same aspherical lens as the plano-convex lens 33 on the receiving fiber 40 side. Upon setting the plano-convex lens 32 to be the same aspherical lens as the plano-convex lens 33, however, the NA of the plano-convex lens 32 becomes 0.1875 (which equals the light beam radius of 1.5 mm/the focal length of 8.0 mm), yielding a separation factor of 1.44 from the NA1 of the transmitting fiber 20 (0.27).

Therefore, in the present embodiment, an aplanatic lens 34 is further disposed between the transmitting fiber 20 and the plano-convex lens 32, as illustrated in FIG. 7, for consistency between the NAs. Here, the aplanatic lens 34 has the effect of expanding the NA of the plano-convex lens 32 by a multiple of the refractive index of the lens material without affecting aberration. Accordingly, by using quartz with a refractive index of 1.45 as the lens material of the aplanatic lens 34, the NA of the plano-convex lens 32 and the NA1 of the transmitting fiber 20 can be nearly caused to match.

In this way, blurring of the light spot due to aberration can be reduced by configuring the plano-convex lenses 32 and 33 as aspherical lenses, thereby improving the focal state of signal light on the entrance face 40en of the receiving fiber 40. Accordingly, this approach offers the advantage of increasing the clearance between the receiving fiber 40 core diameter and the incident light spot diameter.

Figure 8:
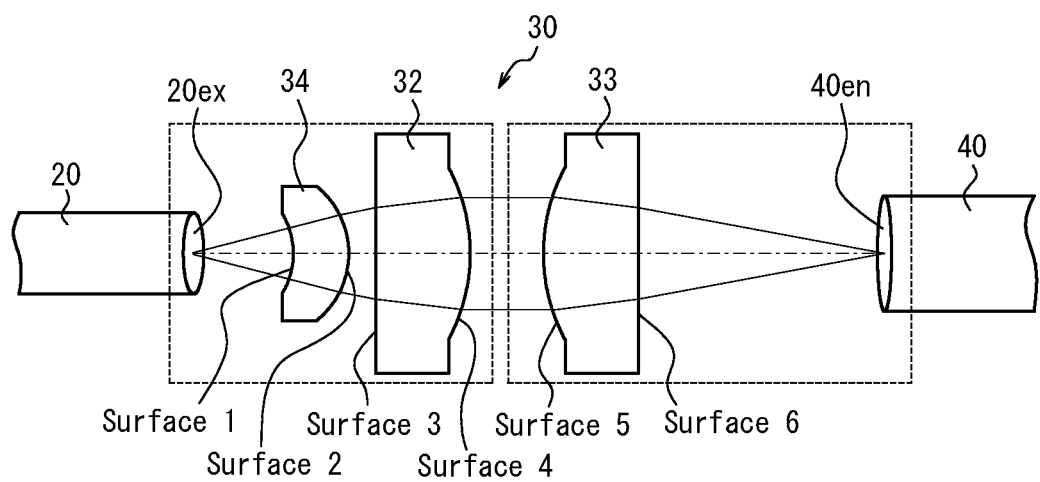
FIG. 8 illustrates the surface numbers in lens data for the optical connector in FIG. 7.

Table 1 lists lens data for the optical connector 30 illustrated in FIG. 7. In Table 1, the transmission-side core represents the exit face 20ex of the transmitting fiber 20, the receiving-side core represents the entrance face 40en of the receiving fiber 40, and the refractive index is the measured value at a measurement wavelength of 850 nm. The units for the radius of curvature and the surface separation are mm. The surface numbers of Table 1 are illustrated in FIG. 8.

TABLE 1

| Surface | Radius of curvature | Surface separation | Glass material | Refractive index |
|---|---|---|---|---|
| Transmission-side core | ∞ | 2.4955 | | 1 |
| Surface 1 | −2.5 | 1.5 | quartz | 1.45311 |
| Surface 2 | −2.366 | 0.714 | | 1 |
| Surface 3 | ∞ | 2.5 | N-SF5 | 1.65669 |
| Surface 4 ASP | −5.2766 | 4 | | 1 |
| Surface 5 ASP | 5.2766 | 2.5 | N-SF5 | 1.65669 |
| Surface 6 | ∞ | 6.5264 | | 1 |
| Receiving-side core | ∞ | 0 | | |

In Table 1, the aspherical shape (ASP) of surface 4 and surface 5 is represented by Expression (7) below, where z is the optical axis with the direction of travel of light being positive, and y is a direction perpendicular to the optical axis. In Expression (7), R is the paraxial radius of curvature, k is the conical coefficient, and $A_4$, $A_6$, $A_8$, and $A_{10}$ are the fourth, sixth, eighth, and tenth order aspheric coefficients, respectively. The aspheric coefficients for surface 4 and surface 5 based on Expression (7) are listed in Table 2. In Table 2, "E−n" (n being an integer) represents "$10^{-n}$".

$$z = \frac{y^2/R}{1+\sqrt{1-(1+k)(y^2/R^2)}} + A_4 y^4 + A_6 y^6 + A_8 y^8 + A_{10} y^{10} + A_{12} y^{12} \quad (7)$$

TABLE 2

| Aspheric coefficient | Surface 4 | Surface 5 |
| --- | --- | --- |
| R | −5.2766 | 5.2766 |
| k | −0.5931 | −0.5931 |
| $A_4$ | 0 | 0 |
| $A_6$ | −1.4237E−06 | 1.4237E−06 |
| $A_8$ | 6.0500E−07 | −6.0500E−07 |
| $A_{10}$ | −3.9471E−08 | 3.9471E−08 |
| $A_{12}$ | 0 | 0 |

As described above, the image of the exit face 20ex of the transmitting fiber 20 in the present embodiment is formed by being expanded to the entrance face 40en of the receiving fiber 40 in the optical connector 30. This magnifying ratio becomes four or less through a combination of thicknesses of commercial optical fibers. Accordingly, the imaging magnification βcon of the optical connector 30 is set so that 1.1<|βcon|<3.9.

Next, the configuration of the optical receptacle 50 is described.

Figure 9:
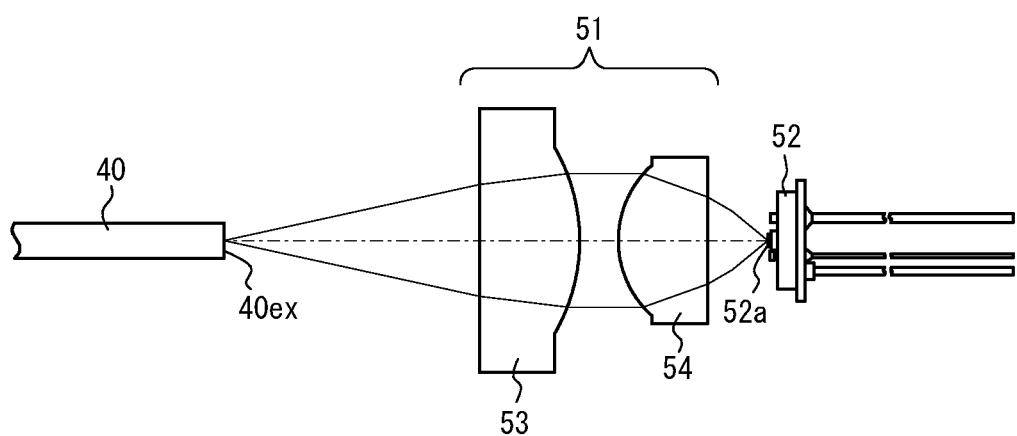
FIG. 9 is a configuration diagram for the optical system of the optical receptacle in FIG. 5.

FIG. 9 illustrates the configuration of the optical system of the optical receptacle 50. The optical receptacle 50 illustrated in FIG. 9 includes a collimator lens 53, disposed on the receiving fiber 40 side, and a focusing lens 54, disposed on the light receiving element 52 side, as a lens 51 that guides signal light emitted from the exit face 40ex of the receiving fiber 40 to the receiving surface 52a of the light receiving element 52. As a result, the optical receptacle 50 forms an image of the exit face (core face) 40ex of the receiving fiber 40 on the receiving surface 52a of the light receiving element 52 while reducing the image by an imaging magnification βrec. The collimator lens 53 and the focusing lens 54 can, for example, be configured as aspherical lenses.

Figure 10:
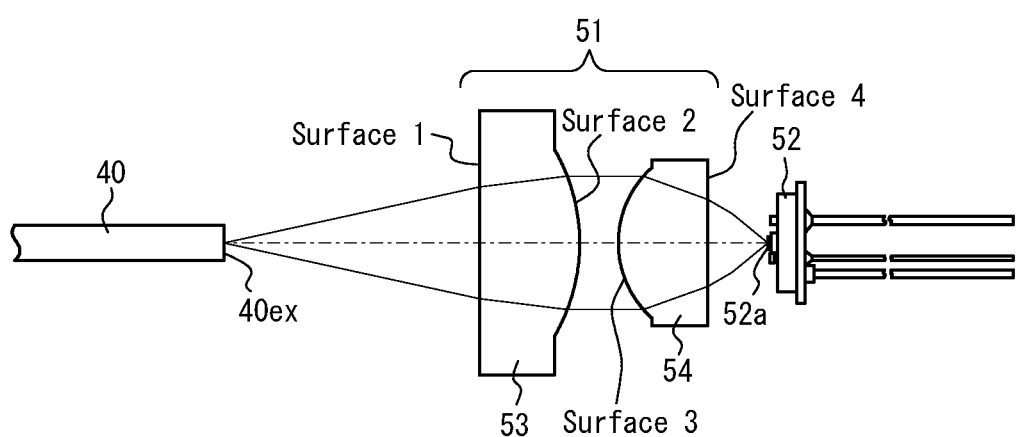
FIG. 10 illustrates the surface numbers in lens data for the optical receptacle in FIG. 9.

Table 3 lists lens data for the optical receptacle 50 illustrated in FIG. 9. In Table 3, the reception-side core represents the exit face 40ex of the receiving fiber 40, the light receiving element represents the receiving surface 52a, and the refractive index is the measured value at a measurement wavelength of 850 nm. The units for the curvature radius and the surface separation are mm, The surface numbers of Table 3 are illustrated in FIG. 10.

TABLE 3

| Surface | Radius of curvature | Surface separation | Glass material | Refractive index |
| --- | --- | --- | --- | --- |
| Receiving-side core | ∞ | 6.5264 | | 1 |
| Surface 1 | ∞ | 2.5 | N-SF5 | 1.65669 |
| Surface 2 ASP | −5.2766 | 1 | | 1 |
| Surface 3 ASP | 2.1751 | 2.24 | DZLaF52LA | 1.79041 |
| Surface 4 | ∞ | 1.5008 | | 1 |
| Light receiving element | ∞ | | | |

In Table 3, the aspherical shape (ASP) of surface 2 is represented by Expression (7) above. The aspheric coefficients fir surface 2 based on Expression (7) are listed in Table 4. As is clear from Table 4, the collimator lens 53 is the same as the plano-convex lenses 32 and 33 in FIG. 7.

TABLE 4

| Aspheric coefficient | Surface 2 |
| --- | --- |
| R | −5.2766 |
| k | −0.5931 |
| $A_4$ | 0 |
| $A_6$ | −1.4237E−06 |

TABLE 4-continued

| Aspheric coefficient | Surface 2 |
| --- | --- |
| $A_8$ | 6.0500E−07 |
| $A_{10}$ | −3.9471E−08 |
| $A_{12}$ | 0 |

In Table 3, the aspherical shape (ASP) of surface 3 is represented by Expression (7) above. The aspheric coefficients for surface 3 based on Expression (7) are listed in Table 5.

TABLE 5

| Aspheric coefficient | Surface 3 |
| --- | --- |
| R | 2.1751 |
| k | −1.2764 |
| $A_4$ | 8.8692E−03 |
| $A_6$ | −3.0822E−05 |
| $A_8$ | −8.5691E−06 |
| $A_{10}$ | −3.8098E−06 |
| $A_{12}$ | 1.9376E−07 |

Figure 11:
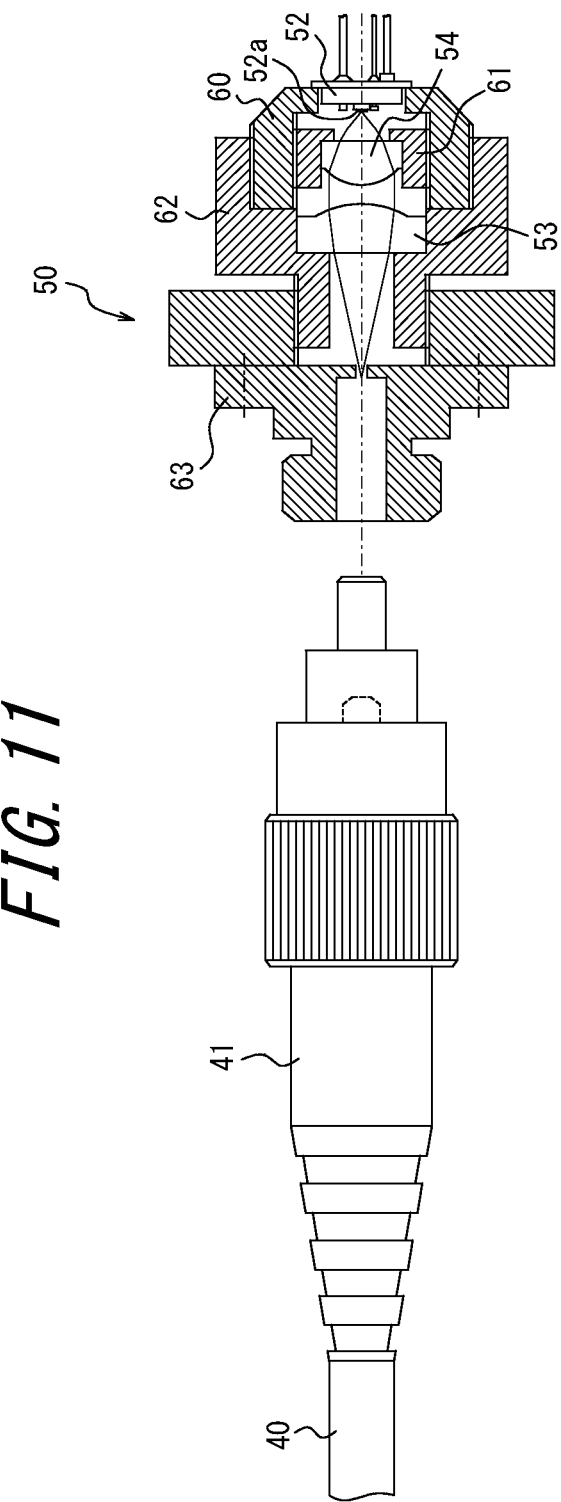
FIG. 11 is a cross-sectional diagram illustrating the principal configuration of the optical receptacle in FIG. 9.

FIG. 11 is a cross-sectional diagram illustrating the principal configuration of the optical receptacle 50 illustrated in FIG. 9. The optical receptacle 50 includes a light receiving element holder 60 that holds the light receiving element 52, a first lens holder 61 that holds the focusing lens 54, a second lens holder 62 that holds the collimator lens 53, and an FC receptacle 63. The light receiving element holder 60, the first lens holder 61, the second lens holder 62, and the FC receptacle 63 are each formed to be hollow.

The light receiving element 52 is a flanged CAN package type and is mounted onto one end of the light receiving element holder 60 with the receiving surface 52a exposed and the flange therebetween. In the state of holding the focusing lens 54, the first lens holder 61 is mounted on the inner circumferential surface of the light receiving element holder 60 so as to have an adjustable position in the optical axis direction. After position adjustment of the first lens holder 61, the light receiving element holder 60 is mounted on the inner circumferential surface at one end of the second lens holder 62, in which the collimator lens 53 is held. The FC receptacle 63 is mounted on the outer circumferential surface at the other end of the second lens holder 62 so as to have an adjustable position in the optical axis direction.

An FC connector 41 mounted onto the emission end of the receiving fiber 40, as illustrated in the external view in FIG. 11, is mounted detachably to the FC receptacle 63. When signal light is emitted from the receiving fiber 40 while the FC connector 41 is mounted onto the FC receptacle 63, the signal light passes through the collimator lens 53 and the focusing lens 54 to be focused on the receiving surface 52a of the light receiving element 52.

The optical receptacle 50 according to the present embodiment results in a focal length of 8.03 mm for the collimator lens 53 and a focal length of 2.75 mm for the focusing lens 54. Therefore, the imaging magnification βrec becomes 0.34 (2.75 mm/8.03 mm). Accordingly, the light spot diameter of the signal light formed on the receiving surface 52a becomes 51 μm (core diameter φ2 (150 μm) of the receiving fiber 40×imaging magnification βrec (0.34)) and hence can nearly be matched to the receiving diameter φpd (50 μm) of the receiving surface 52a of the light receiving element 52.

The NApd of the signal light focused on the light receiving element 52 becomes 0.58 (equal to the NA2 (0.2) of the receiving fiber 40/the imaging magnification βrec (0.34)), so that signal light can be made incident on the light receiving element 52 at a smaller NApd than the initial design target of 0.65. The transmitted wavefront aberration along the axis in the optical receptacle 50 in this case becomes rms0.0015λ, (here λ=850 nm). This aberration is sufficiently small, yielding a good focused state for the light spot.

As described above, the image of the exit face 40ex of the receiving fiber 40 in this embodiment is formed by being reduced on the receiving surface 52a of the light receiving element 52 in the optical receptacle 50. Accordingly, the imaging magnification βrec of the optical receptacle 50 is preferably set to satisfy 0.1<βrec<1.

The optical signal transmission system according to this embodiment uses the receiving fiber 40 that has a thicker core diameter than the transmitting fiber 20 does. As a result, the tolerance for misalignment between the light spot and the core of the receiving fiber 40 in the optical connector 30 can be increased above that of the configuration in FIG. 28. Accordingly, the NApd of signal light incident on the light receiving element 52 in the optical receptacle 50 can be efficiently reduced with a typically used lens. Hence, the signal light can be caused to be incident on the small-diameter receiving surface 52a in a good focused state while maintaining the frequency response speed of the light receiving element.

Furthermore, since the optical connector 30 is configured to be detachable between the plano-convex lens 32 and the plano-convex lens 33 that are disposed with the convex surfaces facing each other, the convex surfaces of the plano-convex lenses 32 and 33 are exposed when the optical connector 30 is detached. Accordingly, it becomes more difficult for water droplets or the like to adhere to the convex surfaces of the plano-convex lenses 32 and 33, thereby preventing dirt or the like from impeding transmission of the signal light.

Embodiment 2

In the optical signal transmission system according to Embodiment 2, the plano-convex lenses 32 and 33 configuring the optical connector 30 in Embodiment 1 are configured as spherical lenses. In this case, if the aplanatic lens 34 is simply omitted from the configuration in FIG. 7 and the plano-convex lenses 32 and 33 are configured as spherical lenses, then depending on the design, the light spot of the signal light formed on the entrance face 40en of the receiving fiber 40 may blur in some cases due to aberration, To reduce this aberration, the NA of the optical fibers for transmission and reception need to be reduced (for example, to an NA of 0.15 or less). The core diameter and the NA in a multi-mode fiber are typically large, however, as this makes it easier for light to enter.

Figure 12:
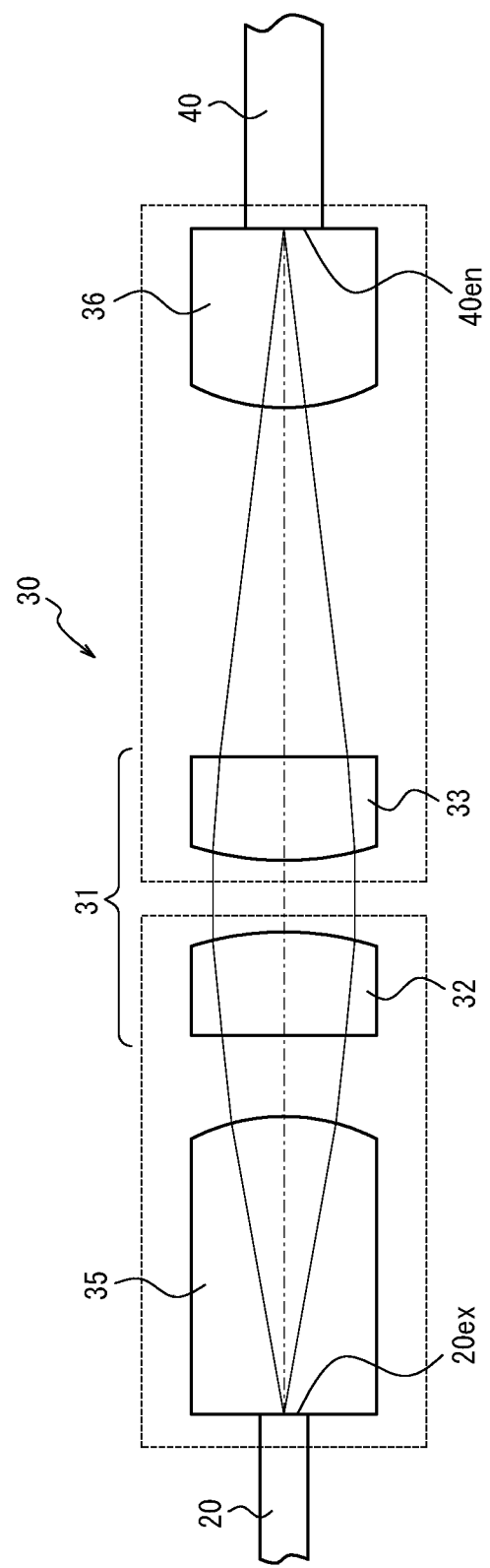
FIG. 12 is a configurational diagram fir the optical system of the optical connector in an optical signal transmission system according to Embodiment 2.

In the present embodiment, the optical connector 30 is configured as illustrated in FIG. 12. As the lens 31 that guides signal light emitted from the exit face 20ex of the transmitting fiber 20 to the entrance face 40en of the receiving fiber 40, the optical connector 30 illustrated in FIG-. 12 includes plano-convex lenses 32 and 33 constituted by spherical lenses, along with a solid immersion lens 35 joined to the exit face 20ex of the transmitting fiber 20 and a solid immersion lens 36 joined to the entrance face 40en of the receiving fiber 40. In other words, the solid immersion lens 35 is joined to the transmitting fiber 20 and the solid immersion lens 36 is joined to the receiving fiber 40 in this embodiment, thereby reducing the apparent NA of the transmitting fiber 20 and the receiving fiber 40.

Figure 13A:
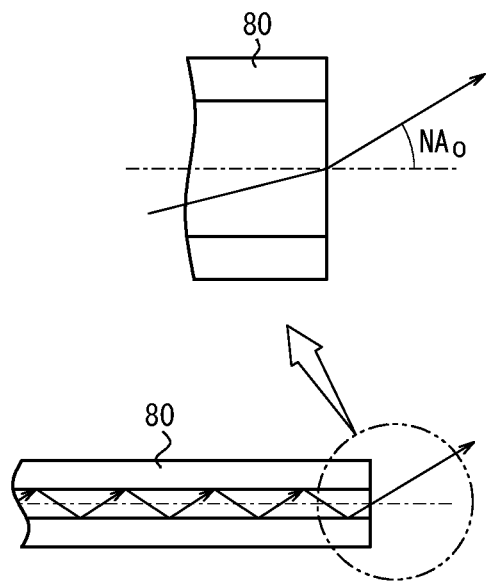
FIG. 13A illustrates a light ray emitted from an optical fiber.

The transmitting fiber 20 and the receiving fiber 40 are, for example, constituted by glass optical fibers. In this case, the core is typically formed from quartz. Accordingly, as illustrated in FIG. 13A, a light ray transmitted through a core 80a of a glass optical fiber 80 is refracted at the end face of the optical fiber 80 and emitted. The NA of the optical fiber 80 in this case is considered to be $NA_0$ for the sake of convenience.

Figure 13B:
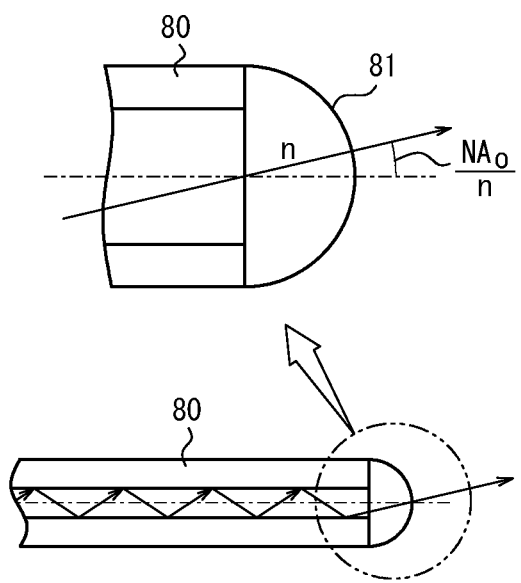
FIG. 13B illustrates a light ray emitted when a hemispherical lens is joined to the exit face of an optical fiber.
Figure 13C:
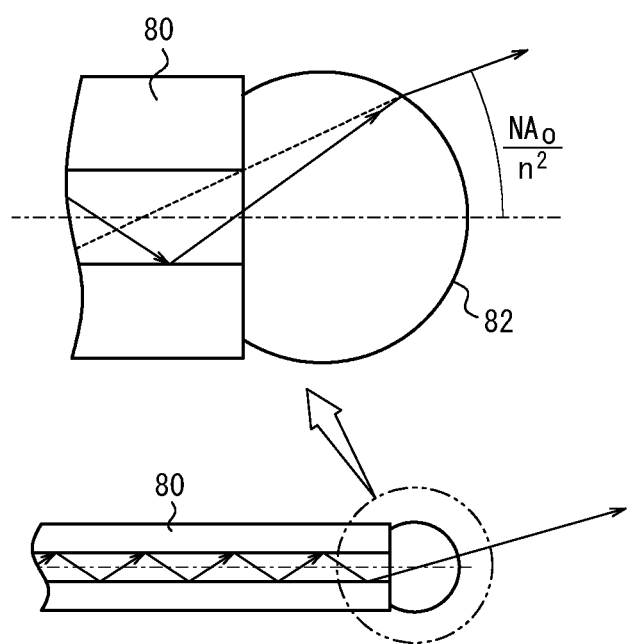
FIG. 13C illustrates a light ray emitted when a super-hemispherical lens is joined to the exit face of an optical fiber.

By contrast, when a hemispherical lens 81 composed of material having the same refractive index n as the core 80a is joined to the exit face of the optical fiber 80 as a solid immersion lens, as illustrated in FIG. 13B, then a light ray transmitted through the core 80a is emitted into the air without being refracted. The apparent NA of the optical fiber 80 is thus reduced to 1/n. Furthermore, when a super-hemispherical lens 82 composed of material having the same refractive index n as the core 80a is joined to the exit face of the optical fiber 80 as a solid immersion lens, as illustrated in FIG. 13C, then the apparent NA of the optical fiber 80 is further reduced to $1/n^2$.

In the present embodiment, the NA1 of the transmitting fiber 20 is 0.27, and the NA2 of the receiving fiber 40 is 0.2. Therefore, the solid immersion lens 35 joined to the exit face 20ex of the transmitting fiber 20 with a large NA is configured by a super-hemispherical lens, and the solid immersion lens 36 joined to the entrance face 40en of the receiving fiber 40 with a small NA is configured by a hemispherical lens.

Accordingly, if the solid immersion lenses 35 and 36 are, for example, constituted by BK7, the apparent NA of the transmitting fiber 20 becomes 0.12, since the refractive index of BK7 at a measured wavelength of 850 nm is 1.509. The apparent NA of the receiving fiber 40 becomes 0.13. The apparent NA of the transmitting fiber 20 and the receiving fiber 40 can thus both be reduced, and at the same time, made nearly equal.

As a result, the aberration can be sufficiently reduced even when the plano-convex lenses 32 and 33 are configured by spherical lenses, thereby allowing the signal light emitted from the exit face 20ex of the transmitting fiber 20 to be focused on the entrance face 40en of the receiving fiber 40 as a light spot with no blur. Since the apparent NA of the transmitting fiber 20 and the receiving fiber 40 can be made nearly equal, the same lenses can be used as the plano-convex lenses 32 and 33.

In the present embodiment, the same plano-convex lenses with a focal length of 8.13 mm are used as the plano-convex lenses 32 and 33. The super-hemispherical solid immersion lens 35 and the hemispherical solid immersion lens 36 each have the same radius of curvature of the spherical surface. A solid immersion lens is produced by processing a portion of a ball lens into a flat surface. Hence, by setting the radius of curvature of the spherical surface to be the same for the solid immersion lenses 35 and 36, the same ball lenses can be used as the material for the solid immersion lenses 35 and 36, offering the advantage of reduced costs.

Table 6 lists lens data for the optical connector 30 illustrated in FIG. 12. In Table 6, the transmission-side core represents the exit face 20ex of the transmitting fiber 20, the receiving-side core represents the entrance face 40en of the receiving fiber 40, and the refractive index is the measured value at a measurement wavelength of 850 nm. The units for the curvature radius and the surface separation are mm. The surface numbers of Table 6 are illustrated in FIG. 14.

TABLE 6

| Surface | Radius of curvature | Surface separation | Glass material | Refractive index |
|---|---|---|---|---|
| Transmission-side core | ∞ | 0 | | 1 |
| Surface 1 | ∞ | 4.09 | N-BK7 | 1.50984 |
| Surface 2 | −2.461 | 1.0875 | | 1 |
| Surface 3 | ∞ | 1.39 | N-BAF10 | 1.65855 |
| Surface 4 | −5.36 | 4 | | 1 |
| Surface 5 | 5.36 | 1.39 | N-BAF10 | 1.65855 |
| Surface 6 | ∞ | 4.7999 | | 1 |
| Surface 7 | 2.461 | 2.461 | N-BK7 | 1.50984 |
| Surface 8 | ∞ | 0 | | 1 |
| Receiving-side core | ∞ | | | |

Using the optical connector 30 illustrated in FIG. 12 results in a transmitted wavefront aberration along the axis in the optical connector 30 of rms0.049λ (where λ=850 nm). This value is below the "Marechal criterion" (an evaluation criterion the considers an aberration of rms0.07λ or less to be good). Consequently, the signal light emitted from the exit face 20ex of the transmitting fiber 20 can be focused on the entrance face 40en of the receiving fiber 40 in a good focused state with sufficiently small aberration.

Figure 15:
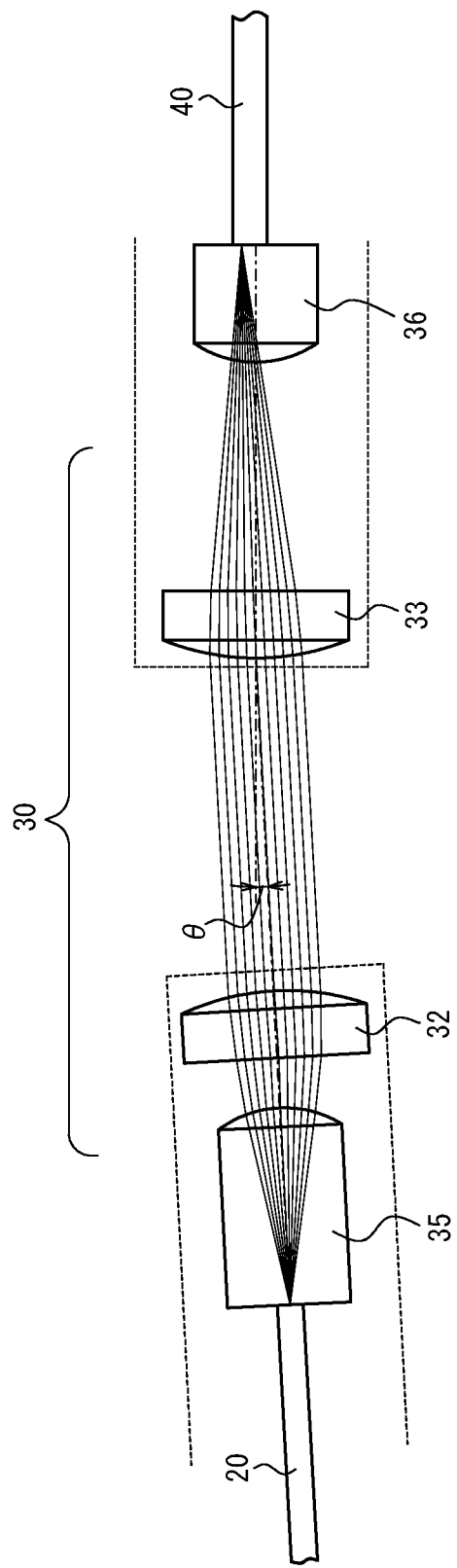
FIG. 15 illustrates positional deviation of the light spot relative to an optical axis inclination error of θ° when coupling the optical connector in FIG. 12.

The plano-convex lens 33 on the receiving fiber 40 side has nearly the same focal length as that of the plano-convex lens 33 constituted by an aspherical lens in Embodiment 1, but the composite focal length with the hemispherical solid immersion lens 36 is 5.3 mm (8.13 mm/1.509) and is therefore shorter than in Embodiment 1. Consequently, the misalignment of the light spot on the entrance face 40en of the receiving fiber 40 with respect to the optical axis inclination error of θ° between the transition end and the receiving end when coupling the optical connector 30 can be reduced, as illustrated in FIG. 15.

Figure 16:
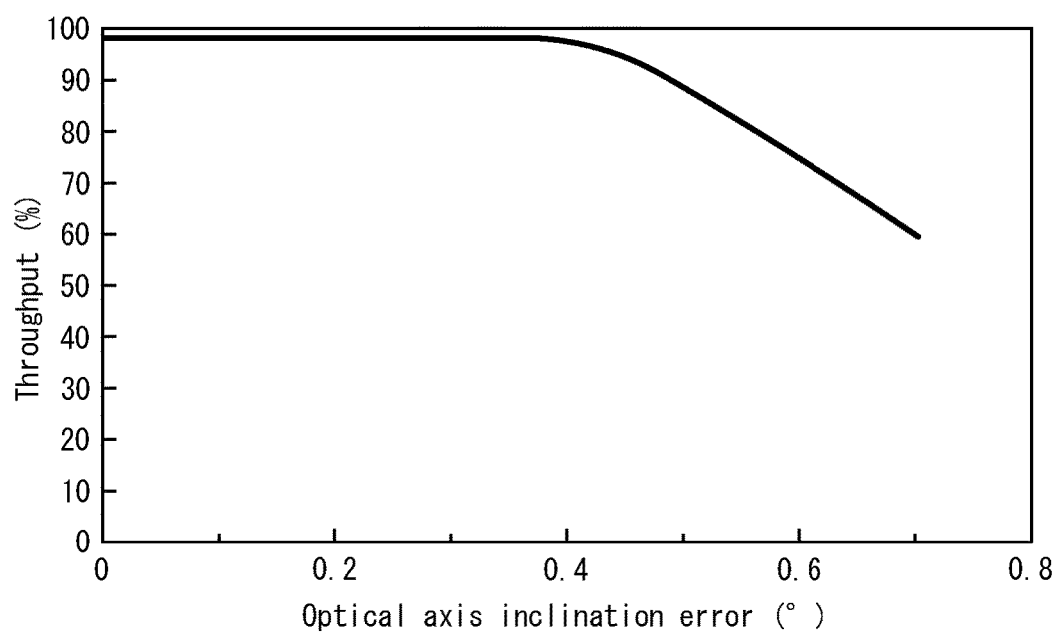
FIG. 16 illustrates the throughput characteristics relative to the optical axis inclination error of θ° for the optical connector in FIG. 12.

As a result, the throughput characteristics of transmission and reception relative to the optical axis inclination error of θ° illustrated in FIG. 16 can be obtained in the optical connector 30. As is clear from FIG. 16, the optical connector 30 illustrated in FIG. 12 allows throughput of 80% or more to be obtained when the optical axis inclination error is within 0.5°, increasing the tolerance of the optical axis inclination error by a factor of 1.5 compared to the optical connector 30 in Embodiment 1.

In addition to the effects of Embodiment 1, the optical signal transmission system according to the present embodiment allows common parts to be used in lens production, since the lens configuration of the optical connector 30 uses spherical lenses that can be manufactured by grinding. The mass productivity can therefore be improved. The present embodiment also has resistance to optical axis inclination error at the transmission and reception sides in the optical connector 30, allowing a reduction in the decrease in throughput due to optical axis inclination error.

Furthermore, in the optical connector 30, the solid immersion lens 35 is joined to the exit face 20ex of the transmitting fiber 20, and the solid immersion lens 36 is joined to the entrance face 40en of the receiving fiber 40, offering the advantage of protecting the respective fiber cores. Protecting the fiber cores in this way prevents the optical line from being disconnected and allows stable use in a poor environment. Reliability, which is important in a communication device, can thus be further improved. In other words, since the core diameter of the fiber is extremely small, signal light is blocked and the optical line cannot be maintained if even one drop of water vapor or one speck of dust adheres to the fiber exposed to the air. By contrast, joining the solid immersion lenses 35 and 36 to the end faces of the transmitting fiber 20 and the receiving fiber 40 in the optical connector 30 as in the present embodiment achieves the above-described effects, because the solid immersion lenses 35 and 36 each also act as cover glass.

To reduce optical loss due to surface reflection, an anti-reflective coating is typically applied to the end face of an optical fiber by a vacuum deposition process. Since the optical fibers are bulky, however, not too many can be placed in a vacuum deposition chamber. Therefore, the price for vapor deposition is relatively high as compared to the case of a lens. With regard to this point, an anti-reflective coating may be applied to the spherical surfaces of the solid immersion lenses 35 and 36 instead of to the end faces of the transmitting fiber 20 and the receiving fiber 40 in the optical connector 30 of the present embodiment, thereby achieving a reduction in the optical loss due to surface reflection at low cost.

Embodiment 3

As described in Embodiment 1, the combination of the core diameter φ2 and the NA2 of the receiving fiber 40 in the optical receptacle 50 needs to be within the usable area in FIG. 6 to prevent the maximum angle of incidence of the light ray incident on the light receiving element 52 from becoming too large. Therefore, in Embodiment 1, for example the receiving fiber 40 has a core diameter φ2 of 150 μm and an NA2 of 0.2.

The optical signal transmission system according to Embodiment 3 has the configuration of Embodiment 1, except that the receiving fiber 40 is configured to be thicker than in Embodiment 1, for example with a core diameter φ2 of 200 μm, and is configured to have an NA2 of 0.2. As a result, the configuration of the optical receptacle 50 also differs. The differences from Embodiment 1 are described below.

Upon increasing the core diameter φ2 of the receiving fiber 40, the optical connector 30 has better resistance to the optical axis inclination error, as described in Embodiment 2. The receiving fiber 40, however, deviates from the useable area in FIG. 6. Therefore, the maximum angle of incidence of signal light incident on the light receiving element 52 in the optical receptacle 50 increases. Specifically, in order to form an image by reducing the core diameter of the receiving fiber 40 of 200 μm to the receiving diameter of the light receiving element 52 of 50 μm, the reduction ratio becomes ¼, and the NA of the focusing lens 54 becomes 0.8 (the NA2 of the receiving fiber 40 (0.2)×4).

A collecting lens with such a large NA, however, is not typical and furthermore requires high precision during lens manufacturing and assembly. In this case, the maximum angle of incidence of signal light incident on the light receiving element 52 becomes 53° (sin⁻¹0.8). Even if an anti-reflective coating is applied to the receiving surface 52a, sufficient anti-reflection over a wide angle is not obtained, and return light is generated.

Figure 17:
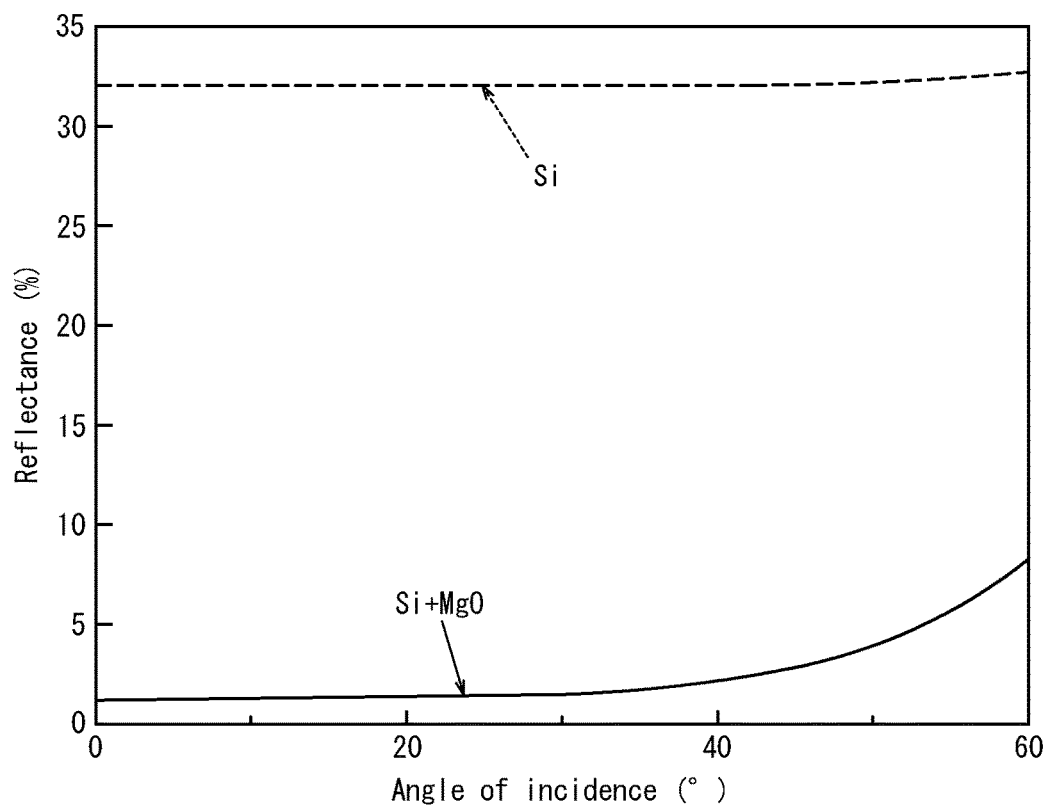
FIG. 17 illustrates the reflectance characteristics relative to the angle of incidence for silicon and an anti-reflective coating.

For example, when the receiving surface 52a of the light receiving element 52 is configured by silicon (Si: refractive index 3.6), which is a typical semiconductor, the average reflectance for the angle of incidence is approximately 30%, as illustrated by the dashed curve in FIG. 17. Even if a single-layer anti-reflective coating composed of MgO (refractive index 1.7) is applied to the receiving surface 52a at a thickness of the optical path length λ/4, the reflectance at an angle of incidence of 40° or greater rises, as indicated by the solid curve in FIG. 17, reaching a reflectance of approximately 5% at an angle of incidence of 53°. FIG. 17 illustrates the reflectance characteristics for when λ is 850 nm.

From these facts, it is reasonable to restrict the NApd of the signal light incident on the light receiving element 52 to 0.65 or lower as a design guideline for the optical receptacle 50 in Embodiment 1. The reason is that an angle of incidence of 40°, at which the reflectance starts to rise, corresponds to an NApd of 0.64 (sin 40°).

In the present embodiment, the aforementioned problem occurring as a result of increasing the core diameter of the receiving fiber is addressed in the optical receptacle 50.

Figure 18:
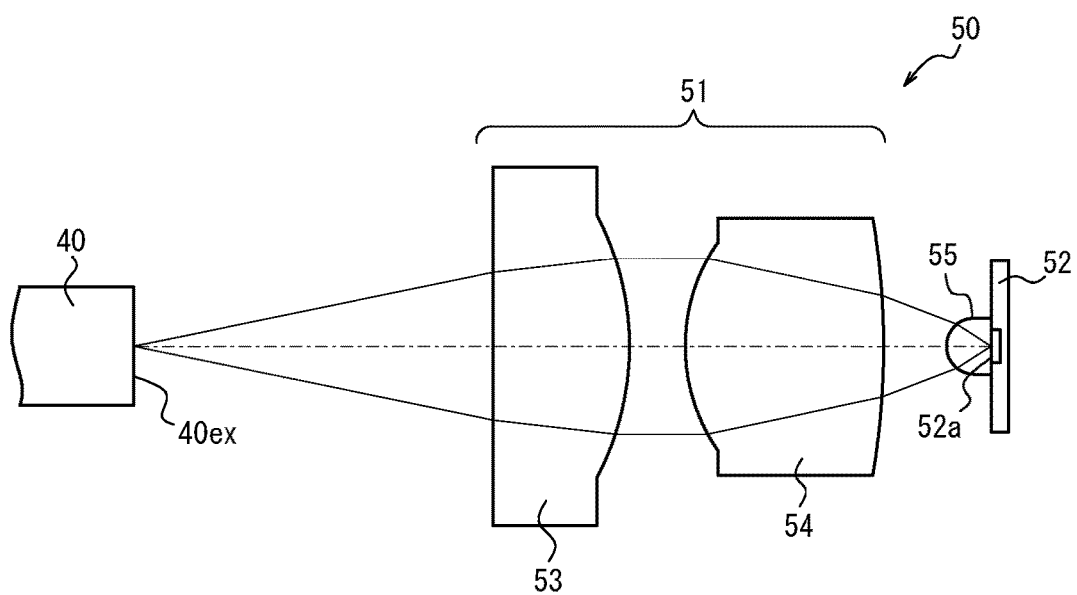
FIG. 18 is a configurational diagram for the optical system of the optical receptacle in an optical signal transmission system according to Embodiment 3.
Figure 19:
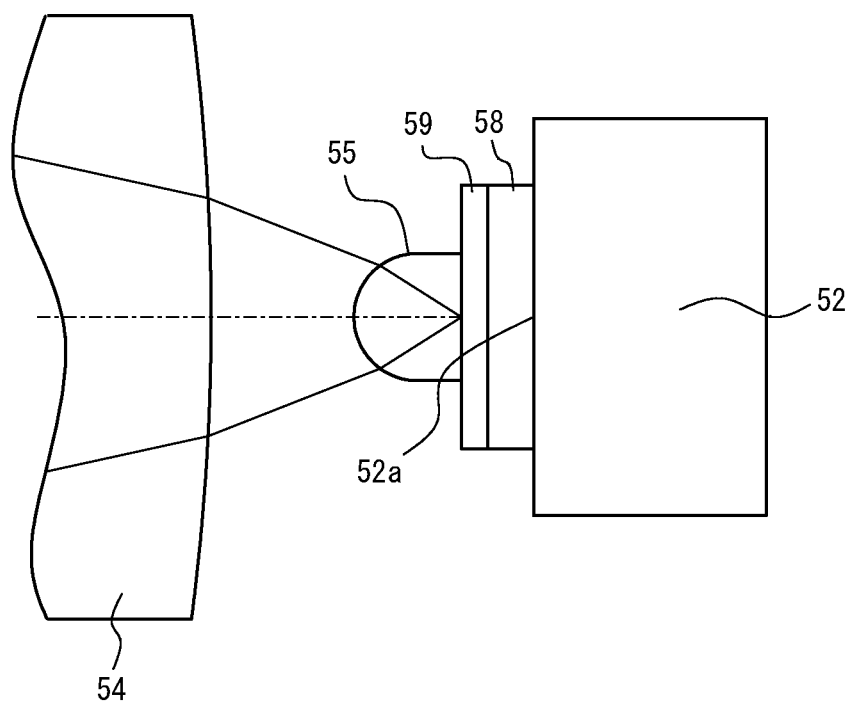
FIG. 19 is a partial cross-sectional diagram of FIG. 18.

FIG. 18 illustrates the configuration of the optical system of the optical receptacle 50 in the present embodiment. In addition to the collimator lens 53 and the focusing lens 54 configuring the lens 51, the optical receptacle 50 illustrated in FIG. 18 includes a solid immersion lens 55 coupled to the light receiving element 52. As illustrated by the principal cross-sectional diagram in FIG. 19, the light receiving element 52 includes a single-layer anti-reflective coating 58 layered on the receiving surface 52a. The anti-reflective coating 58 is, for example, configured by $TiO_2$ (refractive index 2.3) at a thickness of optical path length λ/4 (λ=850 nm).

The solid immersion lens 55 is joined to the receiving surface 52a by adhesive 59. An adhesive that is transparent with respect to light of the wavelength in use and that has a refractive index of, for example, approximately 1.56 may be used as the adhesive 59. The solid immersion lens 55 may be the hemispherical lens 56 illustrated in FIG. 4A or the super-hemispherical lens 57 illustrated in FIG. 4B. FIG. 18 illustrates the case of a super-hemispherical lens.

Figure 20:
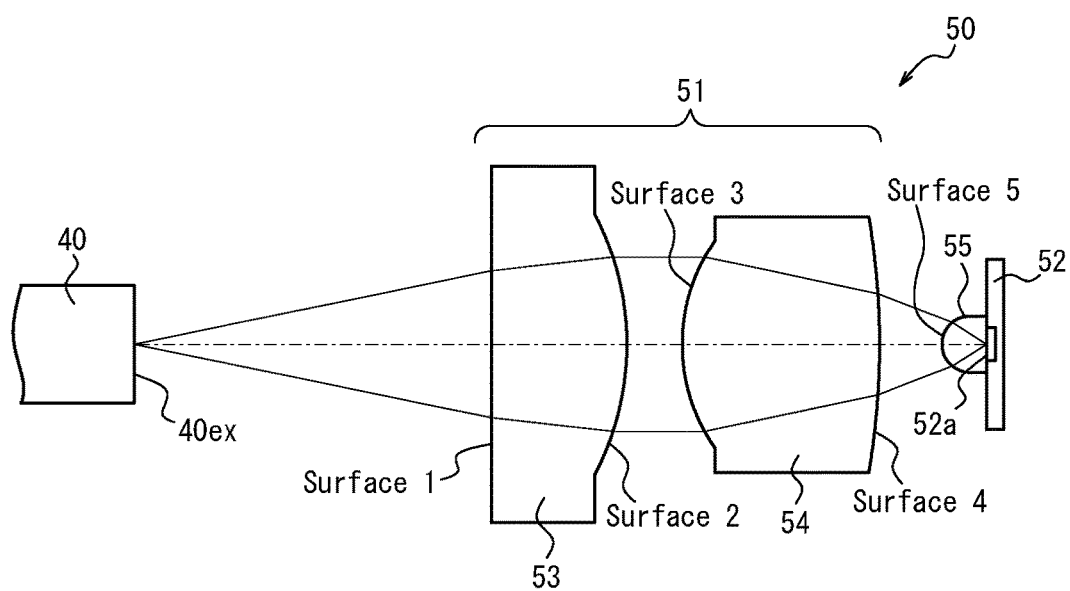
FIG. 20 illustrates the surface numbers in lens data for the optical receptacle in FIG. 18.

Table 7 lists lens data for the optical receptacle 50 illustrated in FIG. 18. In Table 7, the reception-side core represents the exit face 40ex of the receiving fiber 40, the light receiving element represents the receiving surface 52a, and the refractive index is the measured value at a measurement wavelength of 850 nm. The units for the curvature radius and the surface separation are mm. The surface numbers of Table 7 are illustrated in FIG. 20.

TABLE 7

| Surface | Radius of curvature | Surface separation | Glass material | Refractive index |
|---|---|---|---|---|
| Reception-side core | ∞ | 6.5264 | | 1 |
| Surface 1 | ∞ | 2.5 | N-SF5_G | 1.65669 |
| Surface 2 ASP | −5.2766 | 1 | | 1 |
| Surface 3 ASP | 2.8828 | 3.64 | ECO 550 | 1.59326 |
| Surface 4 | −19.136 | 1.1295 | | 1 |
| Surface 5 | 0.5 | 0.8321 | N-BK7_G | 1.50984 |
| Light receiving element | ∞ | 0 | | |

In Table 7, the aspherical shape (ASP) of surface 2 and surface 3 is represented by Expression (7) above. The aspheric coefficients for surface 2 based on Expression (7) are listed in Table 8, and the aspheric coefficients for surface 3 are listed in Table 9.

TABLE 8

| Aspheric coefficient | Surface 2 |
|---|---|
| R | −5.2766 |
| k | −0.5931 |
| $A_4$ | 0 |
| $A_6$ | −1.4237E−06 |

TABLE 8-continued

| Aspheric coefficient | Surface 2 |
|---|---|
| $A_8$ | 6.0500E−07 |
| $A_{10}$ | −3.9471E−08 |
| $A_{12}$ | 0 |

TABLE 9

| Aspheric coefficient | Surface 3 |
|---|---|
| R | 2.8828 |
| k | −1.0033 |
| $A_4$ | 2.1824E−03 |
| $A_6$ | 2.3731E−05 |
| $A_8$ | −4.5110E−06 |
| $A_{10}$ | 0 |
| $A_{12}$ | 0 |

Figure 21:
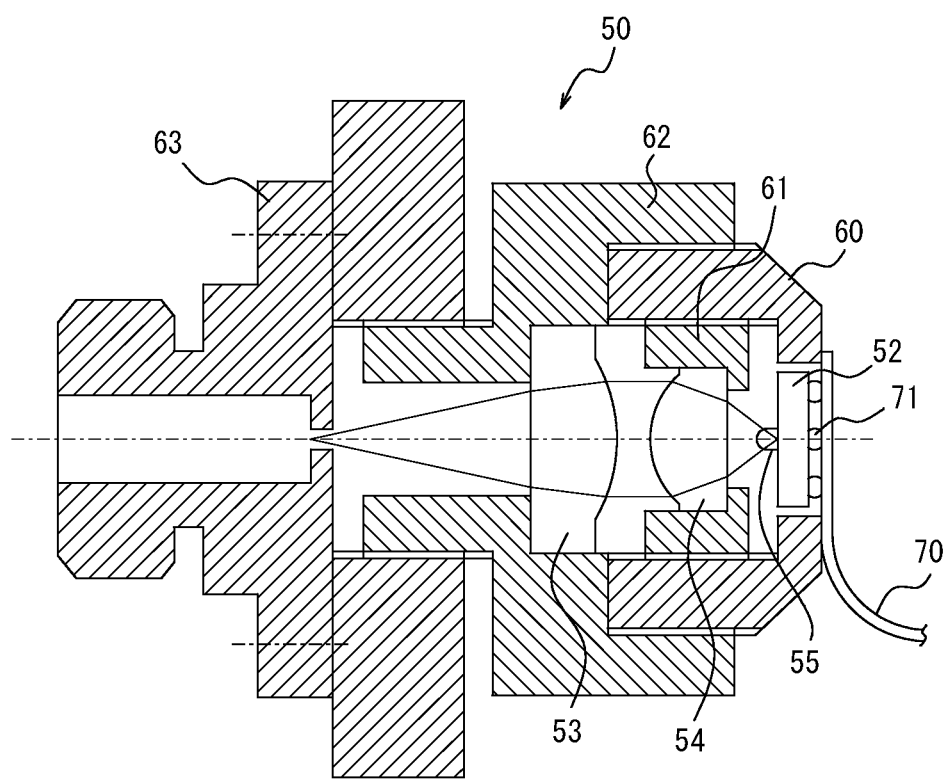
FIG. 21 is a cross-sectional diagram illustrating the principal configuration of the optical receptacle in FIG. 18.

FIG. 21 is a cross-sectional diagram illustrating the principal configuration of the optical receptacle 50 illustrated in FIG. 18. The optical receptacle 50 illustrated in FIG. 21 has a different configuration for the light receiving element 52 than does the optical receptacle 50 illustrated in FIG. 11. The differences are described below. Specifically, the light receiving element 52 is a surface mount board type that, for example, is flip-chip mounted on a flexible substrate 70 with bumps 71 therebetween. With the solid immersion lens 55 joined to the receiving surface 52a via the anti-reflective coating 58 and the adhesive 59, the light receiving element 52 is mounted onto one end of the light receiving element holder 60 via the flexible substrate 70 so as to be positioned within the light receiving element holder 60.

The optical receptacle 50 according to the present embodiment has the effect of expanding the NA of the focusing lens 54 to $n^2$, where n is the refractive index of the material constituting the super-hemispherical solid immersion lens 55. In the present embodiment, as illustrated in FIG. 7, the magnification ratio of the NA is 2.27 times ($1.509^2$), since the glass material of the solid immersion lens 55 is BK7, and the refractive index is 1.509. Accordingly, it suffices for the NA of the focusing lens 54 to be 0.35 (0.8/2.27). Lenses with such an NA are typical, allowing the focusing lens 54 along with the collimator lens 53 to be configured by a commercially available aspherical lens.

Furthermore, since the imaging magnification βrec of the optical receptacle 50 is 0.245, the signal light emitted from the receiving fiber 40, which has a core diameter of 200 μm, can be focused on the receiving surface 52a, which has a receiving diameter of 50 μm, at a light spot diameter of 49 μm (200 μm×0.245). The transmitted wavefront aberration along the axis of the optical system in the optical receptacle 50 in this case becomes rms0.00058λ (where λ=850 nm). This aberration is sufficiently small, yielding a good focused state for the light spot.

Figure 22:
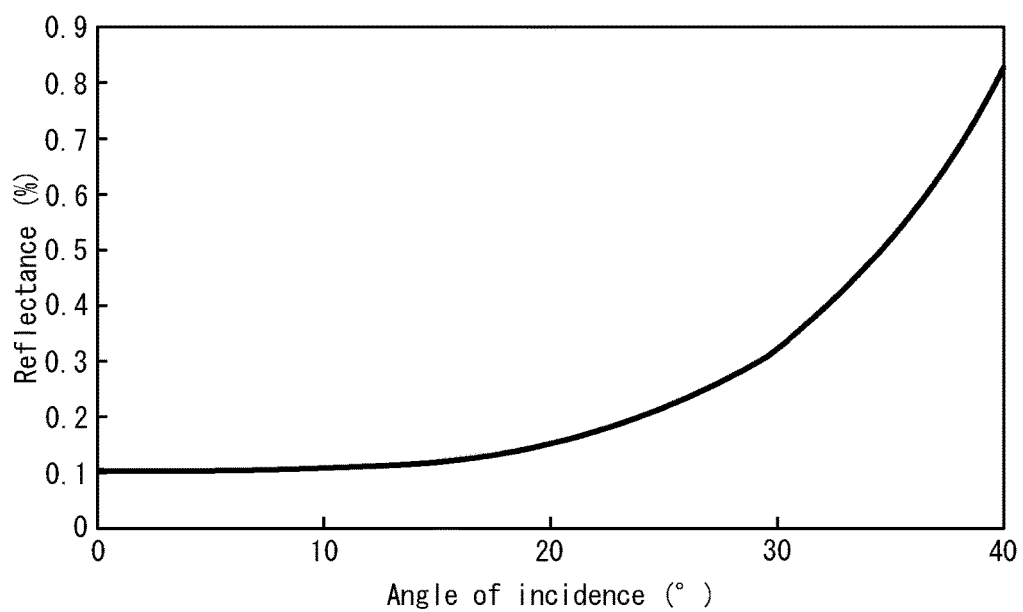
FIG. 22 illustrates the reflectance characteristics relative to the angle of incidence for an anti-reflective coating applied to a light receiving element (silicon) in the optical signal transmission system of Embodiment 3.

The angle of incidence of signal light incident on the receiving surface 52a becomes a maximum of 33° (approximately $\sin^{-1}(0.8/1.509)$) to the axis, since the angle of incidence is reduced along the portion with the refractive index of the material of the solid immersion lens 55. The thin film of adhesive 59 and anti-reflective coating 58 existing between the solid immersion lens 55 and the receiving surface 52a has a refractive index between the refractive index of the medium of the solid immersion lens 55 and the refractive index of the medium forming the receiving surface 52a. Therefore, the refractive index difference of the mediums is small. Accordingly, in conjunction with a reduction in the angle of incidence, the reflectance at the antireflective coating 58 is an extremely small value of 0.5% or less across all angles of incidence from 0° to 33°, as illustrated in FIG. 22. As a result, the return light at the optical receptacle 50 can be extremely reduced.

Furthermore, since the solid immersion lens 55 is coupled to the light receiving element 52, the optical receptacle 50 of the present embodiment can reduce variation of the light spot on the receiving surface 52a relative to a change in position of the light receiving element 52, despite signal light being incident on the light receiving element 52 at a high NA of 0.8. For example, the misalignment of the light spot relative to eccentricity is only $1/n^2$, or approximately ½, as compared to when no solid immersion lens 55 is provided, where n is the refractive index of the material of the solid immersion lens 55. Furthermore, the depth of focus of the focusing lens 54 is inversely proportional to $NA^2$ and is therefore expanded by a factor of $n^4$, or approximately 5, as compared to when no solid immersion lens 55 is provided. Accordingly, blur of the light spot due to defocusing is also reduced, facilitating optical adjustment during assembly of the optical receptacle 50 and also reducing the effect of change over time after assembly.

Figure 23:
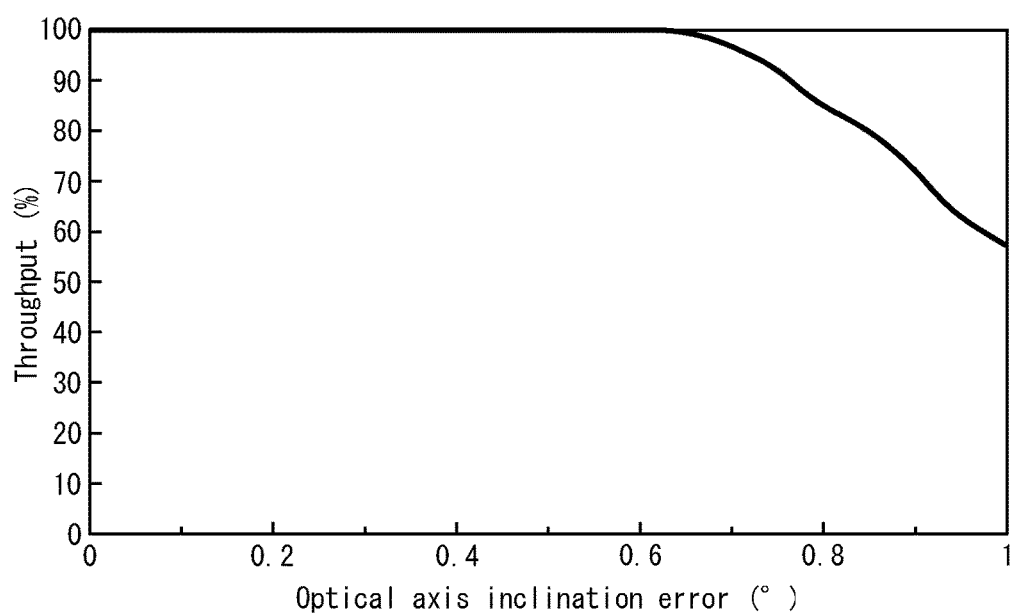
FIG. 23 illustrates the throughput characteristics relative to the optical axis inclination error of θ° for the optical connector of Embodiment 3.

By thus allowing the use of the thick receiving fiber 40 with a core diameter of 200 μm, the throughput characteristics of transmission and reception relative to the optical axis inclination error of θ° illustrated in FIG. 23 can be obtained in the optical connector 30. As is clear from FIG. 23, throughput of 80% or more can be obtained when the optical axis inclination error is within 0.8°, increasing the tolerance of the optical axis inclination error over Embodiment 2.

In FIG. 18, an example of a super-hemispherical lens is illustrated as the solid immersion lens 55, but the solid immersion lens 55 may be a hemispherical lens instead. Furthermore, the solid immersion lens 55 is not limited to glass and may, for example, be resin. In this case, the light receiving element 52 may be directly embedded in the resin by potting or the like, without use of an adhesive. The solid immersion lens 55 is configured by a material with a refractive index of, for example, 1.45 to 2. Accordingly, to expand the etendue of the light receiving element 52 effectively, the solid immersion lens 55 preferably satisfies the relationship 0.4<R/D<0.9, where R is the radius of curvature of the convex lens surface and D is the distance from the surface apex of the convex lens surface to the receiving surface 52a of the light receiving element 52.

As illustrated in FIG. 21, the light receiving element 52 is configured by flip-chip mounting a surface mount board type component on a flexible substrate 70. Accordingly, no obstacles such as wires are present when positioning and joining the solid immersion lens 55 on the receiving surface 52a of the light receiving element 52, thereby facilitating the assembly operation.

The optical signal transmission system according to the present embodiment allows the use of a receiving fiber 40 with a large core diameter, thereby achieving greater tolerance for misalignment between the core of the receiving fiber 40 and the light spot incident on the core in the optical connector 30. As a result, the optical line can be maintained stable while maintaining the frequency response speed of the light receiving element 52, allowing improvement in the reliability of the system.

Embodiment 4

Figure 24:
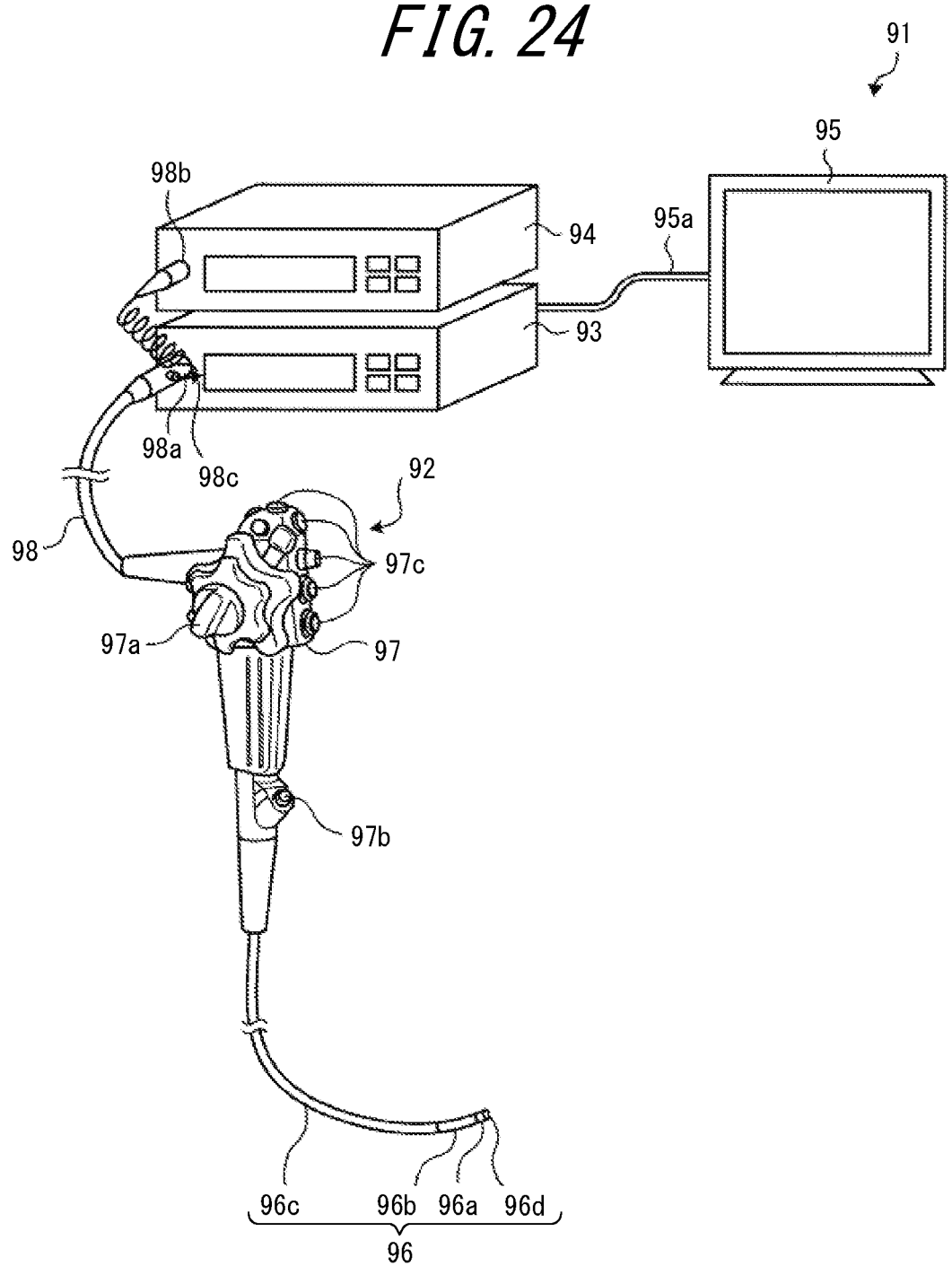
FIG. 24 is a principal configurational diagram of an optical signal transmission system according to Embodiment 4.

FIG. 24 illustrates the principal configuration of the optical signal transmission system according to Embodiment 4. The optical signal transmission system illustrated in FIG. 24 is an application to an endoscope system. An endoscope system 91 includes an endoscope 92 that is introduced inside a subject, images the inside of the subject's body, and generates an image signal of the inside of the subject's body, an information processing apparatus 93 that performs predetermined image processing on the image signal captured by the endoscope 92 and controls the components of the endoscope system 91, a light source apparatus 94 that generates illumination light of the endoscope 92, and a display apparatus 95 that displays an image of the image signal subjected to image processing by the information processing apparatus 93.

The endoscope 92 includes an insertion portion 96 that is inserted inside the subject's body, an operation portion 97, at the base end of the insertion portion 96, that is held and operated by a technician, and a flexible universal cord 98 that extends from the operation portion 97. An illumination fiber, an electric cable, a transmitting fiber, and the like extend within the insertion portion 96 and the universal cord 98 in the endoscope 92. The transmitting fiber is configured in the same way as the transmitting fiber 20 described in the above embodiment The insertion portion 96 includes a tip 96a, a bendable curved portion 96b configured by a plurality of bendable pieces, and a flexible tube 96c disposed at the base end of the curved portion 96b. An illumination portion that illuminates the inside of the subject's body through an illumination lens, an observation portion that images the inside of the subject's body, and an opening 96d and air supply/water supply nozzle that communicate with a channel for treatment tools are provided at a tip 96a.

An imaging element and a transmission module are disposed in the observation portion of the tip 96a. The imaging element is disposed at the image formation position of the optical system for focusing and applies predetermined signal processing, such as photoelectric conversion, to the image of the subject's body formed by the optical system. The transmission module includes a light emitting element that converts an electrical signal including image information output from the imaging element into an optical signal. The transmission module causes the signal light emitted from the light emitting element to be incident on the entrance face of the aforementioned transmitting fiber 20.

The operation portion 97 includes a curved knob 97a that bends the curved portion 96b vertically and horizontally, a treatment tool insertion portion 97b into which one or more treatment tools, such as biological forceps or a laser scalpel, are inserted into a body cavity of the subject, and a plurality of switches 97c for operating the information processing apparatus 93, the light source apparatus 94, and peripheral devices such as an air supply apparatus, a water supply apparatus, and a gas supply apparatus. The treatment tool(s) inserted through the treatment tool insertion portion 97b pass through the channel for treatment tools provided inside and are exposed through the opening 96d at the tip of the insertion portion 96.

The base end of the universal cord 98 is branched into a first connector 98a and an illumination connector 98b. The first connector 98a is detachable from a second connector 98c of the information processing apparatus 93. The illumination connector 98b is detachable from the light source apparatus 94. An optical connector is embedded within the first connector 98a and the second connector 98c. The optical connector is configured in the same way as the optical connector 30 described in the above embodiment and is configured to be detachable by the first connector 98a and the second connector 98c. Accordingly, the transmitting fiber is disposed along the inside of the insertion portion 96 and the universal cord 98 from the tip 96a of the endoscope 92 to the first connector 98a.

The information processing apparatus 93 includes a receiving fiber, which transmits signal light passing through the optical connector embedded in the second connector 98c and incident on the receiving fiber, and an optical receptacle that includes a light receiving element that performs photoelectric conversion on the signal light transmitted through the receiving fiber. The information processing apparatus 93 performs predetermined image processing on the output signal from the light receiving element. The receiving fiber and the optical receptacle are respectively configured in the same way as the receiving fiber 40 and the optical receptacle 50 described in the above embodiment. The information processing apparatus 93 controls each component of the endoscope system 91 on the basis of various instruction signals transmitted from the switches 97c in the operation portion 97 of the endoscope 92 over the universal cord 98.

The light source apparatus 94 is configured using a light source that emits light, a focusing lens, and the like. The light source apparatus 94 emits light from the light source under control of the information processing apparatus 93. The light emitted from the light source passes through the illumination connector 98b and an illumination fiber and is emitted from the illumination portion of the tip 96a of the endoscope 92 to illuminate the inside of the subject's body.

The display apparatus 95 is configured using a liquid crystal or electroluminescence (EL) display or the like. The display apparatus 95 displays various information, including the image on which predetermined image processing is performed by the information processing apparatus 93, through an image cable 95a. As a result, the technician can observe and determine the properties of a desired position inside the subject's body by operating the endoscope 92 while viewing the image (in vivo image) displayed on the display apparatus 95.

The endoscope system 91 according to the present embodiment obtains the same effects as those of the above embodiment. In particular, the present embodiment allows a reduction in diameter of the insertion portion 96 of the endoscope 92, since the core diameter of the transmitting fiber disposed inside the insertion portion 96 can be reduced. Accordingly, the pain felt by the subject when inserting the insertion portion 96 inside a body cavity can be reduced. Furthermore, since a receiving fiber with a larger core diameter than that of the transmitting fiber can be used, signal light can be transmitted with nearly no attenuation even when engagement between the first connector 98a and the second connector 98c constituting the optical connector is slightly misaligned, or when a small amount of dirt or debris adheres to one of the optical elements constituting the optical connector. Accordingly, the reliability of the endoscope system 91 can be improved.

Figure 25:
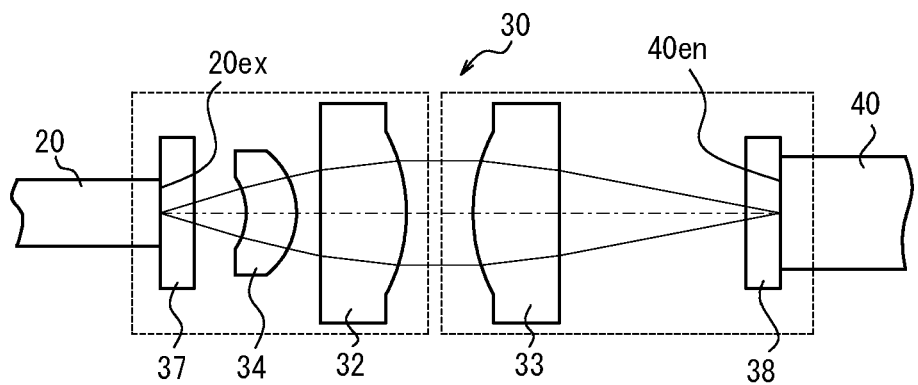
FIG. 25 illustrates a modification to the optical connector in FIG. 7.
Figure 26:
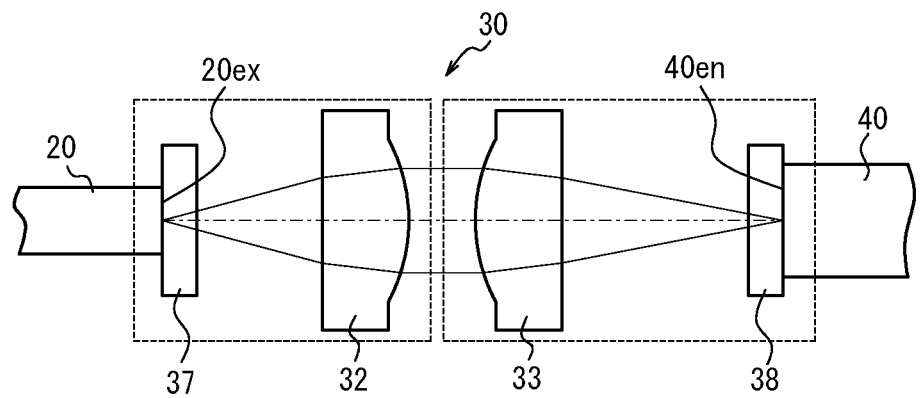
FIG. 26 illustrates a modification to the optical connector in FIG. 25.

The disclosure is not limited only to the above embodiments, and a variety of changes or modifications may be made. For example, in Embodiment 1, the configuration illustrated in FIG. 7 may be modified so that glass covers 37 and 38 transparent with respect to the wavelength being used are joined to the exit face 20ex of the transmitting fiber 20 and the entrance face 40en of the receiving fiber 40 in the optical connector 30, as illustrated in FIG. 25, to protect the respective end faces. This approach achieves the same effects as those described in Embodiment 2. The aplanatic lens 34 may also be omitted from the configuration illustrated in FIG. 25 to configure the optical connector 30 as illustrated in FIG. 26.

Figure 27:
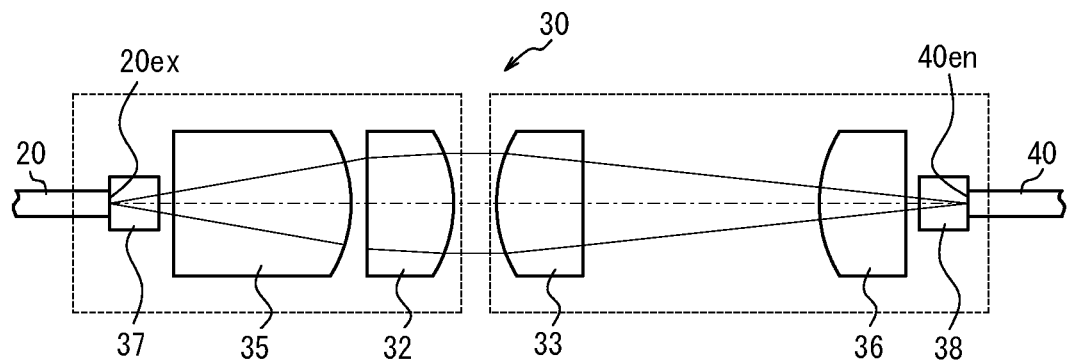
FIG. 27 illustrates a modification to the optical connector in FIG. 12.

Furthermore, in Embodiment 2, the optical connector 30 with the configuration illustrated in FIG. 12 may be modified to separate the solid immersion lenses 35 and 36 from the exit face 20ex of the transmitting fiber 20 and the entrance face 40en of the receiving fiber 40 and to join glass covers 37 and 38 to the exit face 20ex and the entrance face 40en, as illustrated in FIG. 27, so as to protect these end faces.

The optical signal transmission system according to the disclosure is not limited to an optical signal transmission system or an endoscope system as in the above embodiments and may be widely adopted in transmission systems that transmit various signals to a signal processor. Similarly, the optical receptacle according to the disclosure is not limited to an optical signal transmission system or an endoscope system as in the above embodiments and may be widely used as a receiving apparatus for various signals.

The transmitting fiber and receiving fiber are not limited to being single core fibers and may be multi-core fibers.

Furthermore, by including a lens with inorganic material, such as quartz or glass, the optical connector may reduce the change in optical characteristics due to changes in temperature or humidity.

Similarly, by including a lens with inorganic material, the optical receptacle may reduce the change in optical characteristics due to changes in temperature or humidity.

The lenses used in the optical connector and the lenses used in the optical receptacle may be advantageous for reducing spherical aberration by including a lens with a refractive index of 1.5 or greater.

The effects of the disclosure may be achieved more reliably by one or more of the following conditional expressions being satisfied.

$$\phi 2en/\phi 1ex > 2$$

$$\phi pd/\phi 2en < 0.5$$

$$NA1ex/NA2en > 1.2$$

$$(\phi 2en \times NA2en)/(\phi 1ex \times NA1ex) > 1.5$$

REFERENCE SIGNS LIST

10 Laser diode
20 Transmitting fiber
20ex Exit face
30 Optical connector
31 Lens
32, 33 Plano-convex lens
34 Aplanatic lens
35, 36 Solid immersion lens
37, 38 Cover glass
40 Receiving fiber
40en Entrance face
40ex Exit face
50 Optical receptacle
51 Lens
52 Light receiving element
52a Receiving surface
55 Solid immersion lens
56 Hemispherical lens
57 Super-hemispherical lens
70 Flexible substrate

The invention claimed is:

1. An optical signal transmission system comprising:
a transmitting fiber configured to transmit signal light and comprising an exit face from which the signal light is emitted;
a receiving fiber configured to transmit the signal light and comprising an entrance face on which the signal light emitted from the exit face of the transmitting fiber is incident and an exit face from which the signal light is emitted;
an optical connector disposed between the transmitting fiber and the receiving fiber and comprising a lens configured to guide the signal light emitted from the exit face of the transmitting fiber to the entrance face of the receiving fiber; and
an optical receptacle comprising a light receiving element and a lens, the light receiving element comprising a receiving surface on which the signal light transmitted through the receiving fiber is incident and being configured to subject the incident signal light to photoelectric conversion, and the lens of the optical receptacle being configured to guide the signal light transmitted through the receiving fiber to the receiving surface,
wherein $\phi 1ex < \phi 2en$, and $\phi pd < \phi 2en$, where $\phi 1ex$ is a core diameter of the transmitting fiber at the exit face of the transmitting fiber,
where $\phi 2en$ is a core diameter of the receiving fiber at the entrance face of the receiving fiber, and
where $\phi pd$ is a diameter of the receiving surface of the light receiving element, $NA1ex > NA2en$, and $\phi 1ex \times NA1ex < \phi 2en \times NA2en$, where, in the optical connector, $NA1ex$ is a numerical aperture (NA) of the signal light emitted from the transmitting fiber and $NA2en$ is an NA of the signal light incident on the receiving fiber,
the optical receptacle is configured so that $NA2ex < NApd$ at the lens within the optical receptacle,
where $NA2ex$ is an NA at the receiving fiber side, and
where $NApd$ is an NA of the signal light incident on the light receiving element, and
the receiving fiber and the light receiving element are configured to satisfy $\phi 2ex \times NA2ex < \phi pd \times NApd$, where $\phi 2ex$ is a core diameter of the exit face of the receiving fiber.

2. An optical signal transmission system comprising:
a transmitting fiber configured to transmit signal light and comprising an exit face from which the signal light is emitted;
a receiving fiber configured to transmit the signal light and comprising an entrance face on which the signal light emitted from the exit face of the transmitting fiber is incident and an exit face from which the signal light is emitted;
an optical connector disposed between the transmitting fiber and the receiving fiber and comprising a lens configured to guide the signal light emitted from the exit face of the transmitting fiber to the entrance face of the receiving fiber; and
an optical receptacle comprising a light receiving element and a lens, the light receiving element comprising a receiving surface on which the signal light transmitted through the receiving fiber is incident and being configured to subject the incident signal light to photoelectric conversion, and the lens of the optical receptacle being configured to guide the signal light transmitted through the receiving fiber to the receiving surface,
wherein $\phi 1ex < \phi 2en$, and $\phi pd < \phi 2en$, where $\phi 1ex$ is a core diameter of the transmitting fiber at the exit face of the transmitting fiber, where $\phi 2en$ is a core diameter of the receiving fiber at the entrance face of the receiving fiber, and
where $\phi pd$ is a diameter of the receiving surface of the light receiving element, $NA1ex > NA2en$, and $\phi 1ex \times NA1ex < \phi 2en \times NA2en$, where, in the optical connector, $NA1ex$ is a numerical aperture (NA) of the signal light emitted from the transmitting fiber and $NA2en$ is an NA of the signal light incident on the receiving fiber,
the optical receptacle is configured so that $NA2ex < NApd$ at the lens within the optical receptacle,
where $NA2ex$ is an NA at the receiving fiber side, and
where $NApd$ is an NA of the signal light incident on the light receiving element, and
the receiving fiber and the light receiving element are configured to satisfy $\phi 2ex \times NA2ex < \phi pd \times NApd$, where $\phi 2ex$ is a core diameter of the exit face of the receiving fiber, and
the optical receptacle further comprises a solid immersion lens joined to the light receiving element.

3. The optical signal transmission system of claim 2, wherein between the solid immersion lens and the receiving surface, the optical receptacle comprises a thin film having a refractive index between a refractive index of a medium of the solid immersion lens and a refractive index of a medium forming the receiving surface.

4. The optical signal transmission system of claim 2, wherein
the solid immersion lens comprises a convex lens surface on the receiving fiber side, and $0.4 < R/D < 0.9$, where R is a radius of curvature of the convex lens surface, and
where D is a distance from a surface apex of the convex lens surface to the receiving surface.

5. The optical signal transmission system of claim 1, wherein the receiving fiber is a step index type of fiber.

6. The optical signal transmission system of claim 1, wherein $1.1 < |\beta con| < 3.9$, where βcon is an imaging magnification of the optical connector.

7. The optical signal transmission system of claim 6, wherein the optical connector comprises a plurality of lenses and is detachable into two parts between two adjacent lenses among the plurality of lenses.

8. The optical signal transmission system of claim 7, wherein as the plurality of lenses, the optical connector comprises two plano-convex lenses disposed so that respective convex surfaces of the plano-convex lenses face each other, and the optical connector is detachable into two parts between the two plano-convex lenses.

9. The optical signal transmission system of claim 8, wherein the convex surfaces of the two plano-convex lenses have equivalent radii of curvature, and the optical connector further comprises a super-hemispherical lens, disposed between a first one of the plano-convex lenses and the exit face of the transmitting fiber, and a hemispherical lens, disposed between a second one of the plano-convex lenses and the entrance face of the receiving fiber and having the same radius of curvature as the super-hemispherical lens.

10. The optical signal transmission system of claim 1, wherein $$0.1<\beta rec<1,$$

where βrec is an imaging magnification of the optical receptacle.

11. An optical receptacle comprising:
a lens configured to focus light emitted from an optical fiber;
a photodetector configured to receive the light focused by the lens; and
a solid immersion lens coupled to a receiving surface of the photodetector.

12. The optical receptacle of claim 11, wherein
the photodetector is flip-chip mounted, and
the solid immersion lens is fixed to the receiving surface side of the photodetector.

13. The optical receptacle of claim 11, further comprising a thin film between the solid immersion lens and the receiving surface, the thin film having a refractive index between a refractive index of a medium of the solid immersion lens and a refractive index of a medium forming the receiving surface.

14. The optical receptacle of claim 13, wherein the thin film is a single-layer anti-reflective coating.

15. The optical receptacle of claim 11, wherein
NApd is 0.65 or less,
where NApd is a numerical aperture (NA) of the light incident on the photodetector.

16. The optical receptacle of claim 11, wherein
the solid immersion lens comprises a convex lens surface on the optical fiber side, and $$0.4<R/D<0.9,$$

where R is a radius of curvature of the convex lens surface, and
where D is a distance from a surface apex of the convex lens surface to the receiving surface.

* * * * *